(12) United States Patent
Kerr et al.

(10) Patent No.: US 9,108,677 B2
(45) Date of Patent: Aug. 18, 2015

(54) END DUMP TRAILER

(75) Inventors: Darryl James Kerr, Saskatoon (CA); Yowin Daniel Yowin, Saskatoon (CA); Taylor James Ritz, Clavet (CA)

(73) Assignee: WRT Equipment Ltd, Saskatoon (CA)

( * ) Notice: Subject to any disclaimer, the term of this patent is extended or adjusted under 35 U.S.C. 154(b) by 1131 days.

(21) Appl. No.: 12/900,019

(22) Filed: Oct. 7, 2010

(65) Prior Publication Data

US 2012/0086185 A1 Apr. 12, 2012

(51) Int. Cl.
| | |
|---|---|
| *B62D 21/02* | (2006.01) |
| *B60P 1/28* | (2006.01) |
| *B62D 21/20* | (2006.01) |
| *B62D 33/077* | (2006.01) |

(52) U.S. Cl.
CPC . *B62D 21/02* (2013.01); *B60P 1/28* (2013.01); *B60P 1/286* (2013.01); *B62D 21/20* (2013.01); *B62D 33/077* (2013.01); *Y10T 29/49826* (2015.01)

(58) Field of Classification Search
CPC ........ B62D 21/03; B62D 21/06; B62D 21/10; B62D 21/02; B60P 1/00; B60P 1/28; F16B 5/00; F16B 11/00
USPC ......... 280/793, 794; 296/29, 30, 203.01, 204, 296/181.1, 183.2, 193.07, 193.01, 187.08, 296/187.01; 298/1 A, 1 R, 11, 17; 403/205
See application file for complete search history.

(56) References Cited

U.S. PATENT DOCUMENTS

| | | | | |
|---|---|---|---|---|
| 1,066,532 | A * | 7/1913 | Rohlfing | 105/414 |
| 1,805,489 | A | 5/1931 | Kerr | |
| 1,848,895 | A * | 3/1932 | MacPherson | 280/800 |
| 1,954,637 | A * | 4/1934 | Linn | 280/794 |
| 2,449,202 | A | 9/1948 | Day | |
| 2,490,532 | A | 12/1949 | Maxon | |
| 2,685,475 | A * | 8/1954 | Anthony | 298/22 P |
| 2,775,480 | A | 12/1956 | Braswell et al. | |

(Continued)

FOREIGN PATENT DOCUMENTS

| | | |
|---|---|---|
| DE | 102009012350 | 9/2010 |
| EP | 1609669 | 11/2007 |

(Continued)

OTHER PUBLICATIONS

Hercules Semitrailer brochure, 2 pp.

(Continued)

*Primary Examiner* — Joseph Rocca
*Assistant Examiner* — Daniel Yeagley
(74) *Attorney, Agent, or Firm* — Lathrop & Gage LLP

(57) ABSTRACT

A trailer frame assembly for a fifth wheel trailer frame in which at least a portion of the frame is torsionally stiffened with a rectangular closed section in a transverse cross section. The rectangular closed section is formed by longitudinal, parallel spaced vertical side plates, a top pan extending between top portions of the side plates, and a bottom pan between bottom portions of the side plates. Overlap joints between the side plates and the top and bottom pans allow for connection with threaded or rivet fasteners. An end dump semi trailer is also provided with a double acting lift cylinder on each side of the trailer. Also provided is a latch lift assembly for a dump gate using a linkage assembly to impart vertical upward movement to dump gate to unlatch the dump gate from a cradle catch.

34 Claims, 27 Drawing Sheets

(56) References Cited

U.S. PATENT DOCUMENTS

| | | | |
|---|---|---|---|
| 2,843,231 A * | 7/1958 | Maruhn | 403/187 |
| 2,912,253 A | 11/1959 | Harris et al. | |
| 2,953,410 A | 9/1960 | Chaney | |
| 2,999,721 A | 9/1961 | Wood | |
| 3,096,996 A | 7/1963 | Cole | |
| 3,181,914 A * | 5/1965 | Humes | 298/17 R |
| 3,310,345 A | 3/1967 | Rowden | |
| 3,580,611 A * | 5/1971 | McNitt | 280/433 |
| 3,712,676 A * | 1/1973 | Benninger et al. | 298/22 R |
| 3,827,753 A * | 8/1974 | Pitts | 298/1 B |
| 3,833,261 A * | 9/1974 | Dingler | 298/1 A |
| 3,844,616 A | 10/1974 | Acker | |
| 4,307,541 A | 12/1981 | Farmer et al. | |
| 4,382,632 A | 5/1983 | Pitts | |
| 4,488,756 A * | 12/1984 | Dalman | 298/19 B |
| 4,540,095 A | 9/1985 | Wormser et al. | |
| 4,570,973 A * | 2/1986 | Ewers et al. | 280/800 |
| 4,592,593 A * | 6/1986 | Channell | 298/22 J |
| 4,616,879 A | 10/1986 | Booher | |
| 4,699,428 A * | 10/1987 | Vick | 298/23 MD |
| 4,711,500 A * | 12/1987 | Spanton et al. | 298/17 S |
| 4,729,710 A * | 3/1988 | Kress et al. | 414/421 |
| 4,943,118 A * | 7/1990 | Davis | 298/12 |
| 5,067,740 A * | 11/1991 | Christenson | 280/407 |
| 5,338,101 A * | 8/1994 | Colip | 298/17 R |
| 5,431,475 A | 7/1995 | Perry | |
| 5,482,356 A * | 1/1996 | Goodson, Jr. | 298/22 AE |
| 5,551,759 A * | 9/1996 | Hoss et al. | 298/22 P |
| 5,611,570 A | 3/1997 | Garcia | |
| 5,681,095 A | 10/1997 | Martin | |
| 5,722,688 A * | 3/1998 | Garcia | 280/789 |
| 5,725,350 A * | 3/1998 | Christenson | 414/491 |
| 5,836,657 A * | 11/1998 | Tilley et al. | 298/1 A |
| 6,061,989 A * | 5/2000 | Trivedi et al. | 52/633 |
| 6,116,697 A * | 9/2000 | Smith et al. | 298/22 R |
| 6,135,565 A | 10/2000 | Bachelor | |
| 6,170,916 B1 | 1/2001 | Lawson | |
| 6,286,868 B1 * | 9/2001 | von Mayenburg | 280/800 |
| 6,312,006 B1 * | 11/2001 | Svensson | 280/683 |
| 6,490,772 B2 * | 12/2002 | Deckert et al. | 29/90.7 |
| 6,561,589 B2 | 5/2003 | Jones | |
| 6,565,146 B2 | 5/2003 | Fujan et al. | |
| 6,623,234 B1 | 9/2003 | Herring et al. | |
| 6,637,808 B1 | 10/2003 | Ling et al. | |
| 6,641,206 B1 | 11/2003 | Bergstrom et al. | |
| 6,681,489 B1 * | 1/2004 | Fleming | 29/897.2 |
| 6,712,393 B2 * | 3/2004 | Philipps | 280/794 |
| 6,761,414 B1 | 7/2004 | Broberg | |
| 6,767,173 B1 | 7/2004 | Sunila | |
| 6,854,789 B2 * | 2/2005 | Kloepfer | 296/183.2 |
| 6,929,329 B2 | 8/2005 | Kent et al. | |
| 6,931,720 B2 | 8/2005 | Thompson | |
| 7,156,421 B2 * | 1/2007 | Fowler et al. | 280/781 |
| 7,198,282 B2 * | 4/2007 | Burchett | 280/433 |
| 7,214,028 B2 * | 5/2007 | Boasso et al. | 414/812 |
| 7,261,322 B2 * | 8/2007 | Ito et al. | 280/781 |
| 7,591,513 B2 | 9/2009 | Morley | |
| 7,699,384 B2 * | 4/2010 | Duerr et al. | 296/204 |
| 7,938,429 B2 * | 5/2011 | Mann et al. | 280/438.1 |
| 7,992,943 B2 * | 8/2011 | Westner | 298/22 P |
| 8,303,044 B2 * | 11/2012 | Obermeyer | 298/22 R |
| 8,328,290 B2 * | 12/2012 | Malatesta et al. | 298/17 R |
| 8,534,412 B2 * | 9/2013 | Huhn et al. | 180/312 |
| 2003/0127269 A1 * | 7/2003 | Eliasson | 180/272 |
| 2006/0202509 A1 | 9/2006 | Westner | |
| 2006/0232121 A1 * | 10/2006 | Morley | 298/23 S |
| 2007/0069500 A1 | 3/2007 | Bloodworth et al. | |
| 2007/0201517 A1 * | 8/2007 | Gruneklee et al. | 372/1 |
| 2008/0018135 A1 | 1/2008 | Risner | |
| 2009/0146488 A1 | 6/2009 | Kennedy | |
| 2009/0315297 A1 | 12/2009 | Nadeau et al. | |
| 2009/0322057 A1 | 12/2009 | Quenzi et al. | |
| 2010/0244497 A1 * | 9/2010 | Honda et al. | 296/205 |
| 2010/0327649 A1 * | 12/2010 | Kvist et al. | 298/19 R |

FOREIGN PATENT DOCUMENTS

| | | |
|---|---|---|
| GB | 569881 | 6/1945 |
| GB | 832479 | 4/1960 |
| GB | 2460123 | 11/2009 |
| JP | 02162169 A * | 6/1990 |
| JP | 06048316 A * | 2/1994 |
| JP | 06183369 A * | 7/1994 |
| WO | 03/068559 | 8/2003 |
| WO | 2005/030563 | 4/2005 |
| WO | 2006/096599 | 9/2006 |
| WO | 2006/102714 | 10/2006 |
| WO | WO 2009008785 A1 * | 1/2009 |
| WO | WO 2009108104 A1 * | 9/2009 |

OTHER PUBLICATIONS

Thompsons, New Hydraulically Opening Tailgate brochure, 2 pp, downloaded from the internet Dec. 1, 2011.

Australian Examination Report, dated Aug. 13, 2014, for in Australian patent application serial No. 2010227011, 7 pp.

* cited by examiner

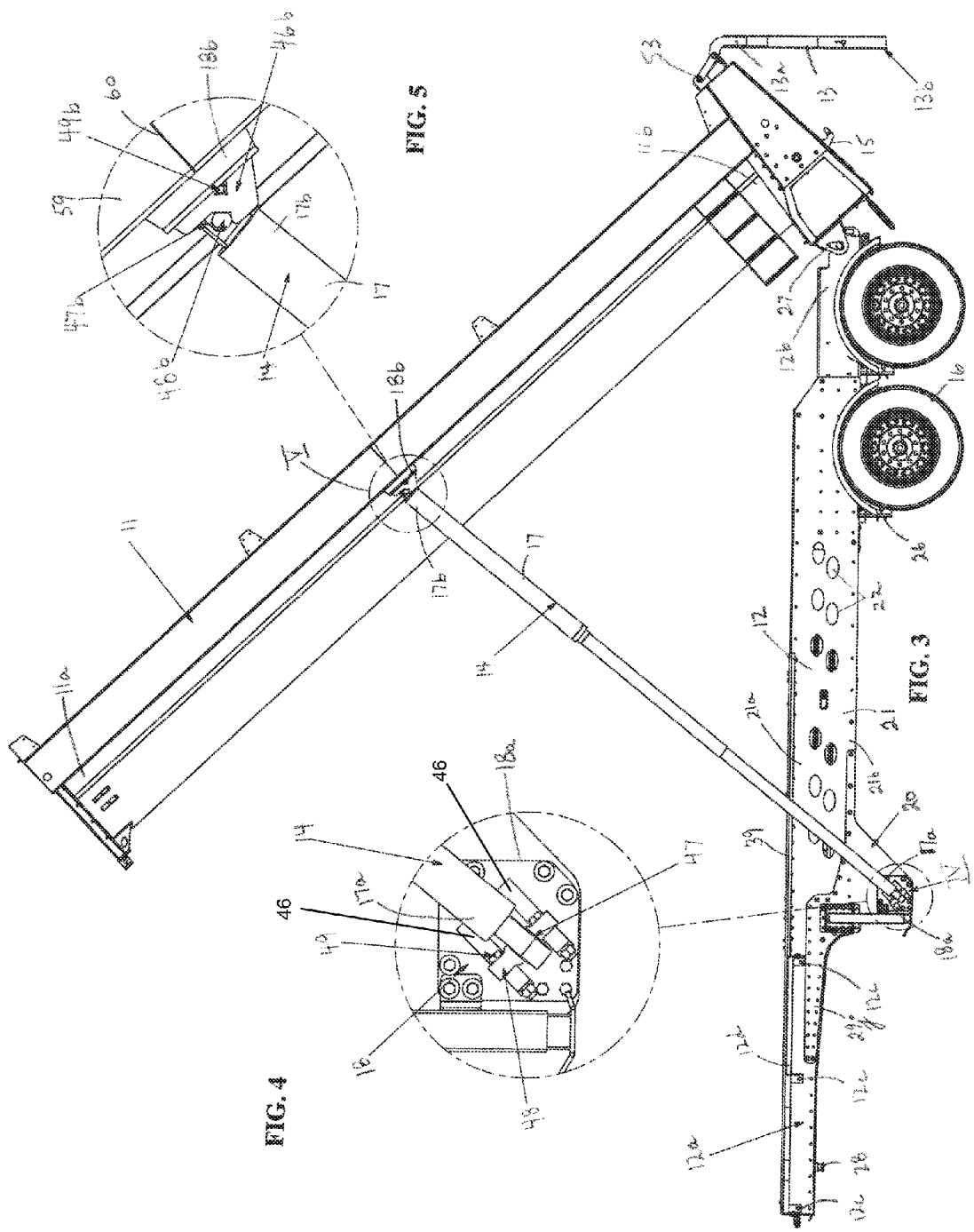

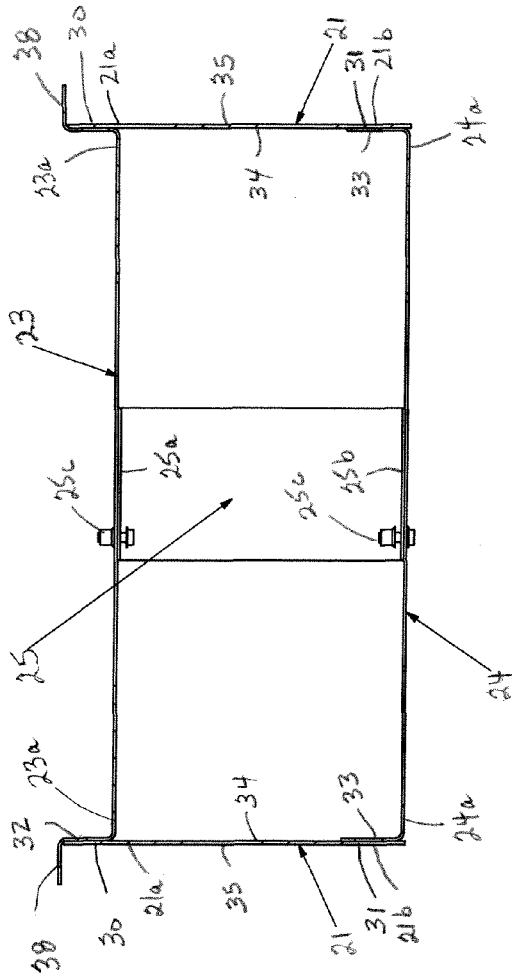
FIG. 9
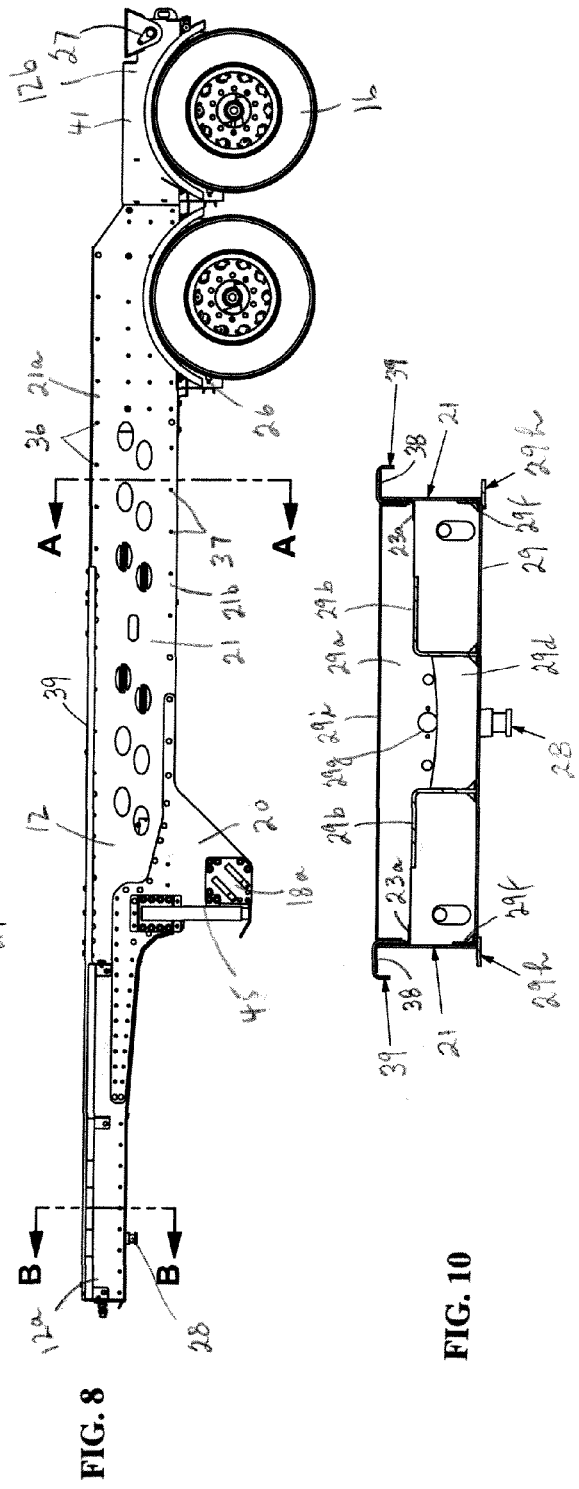
FIG. 8
FIG. 10

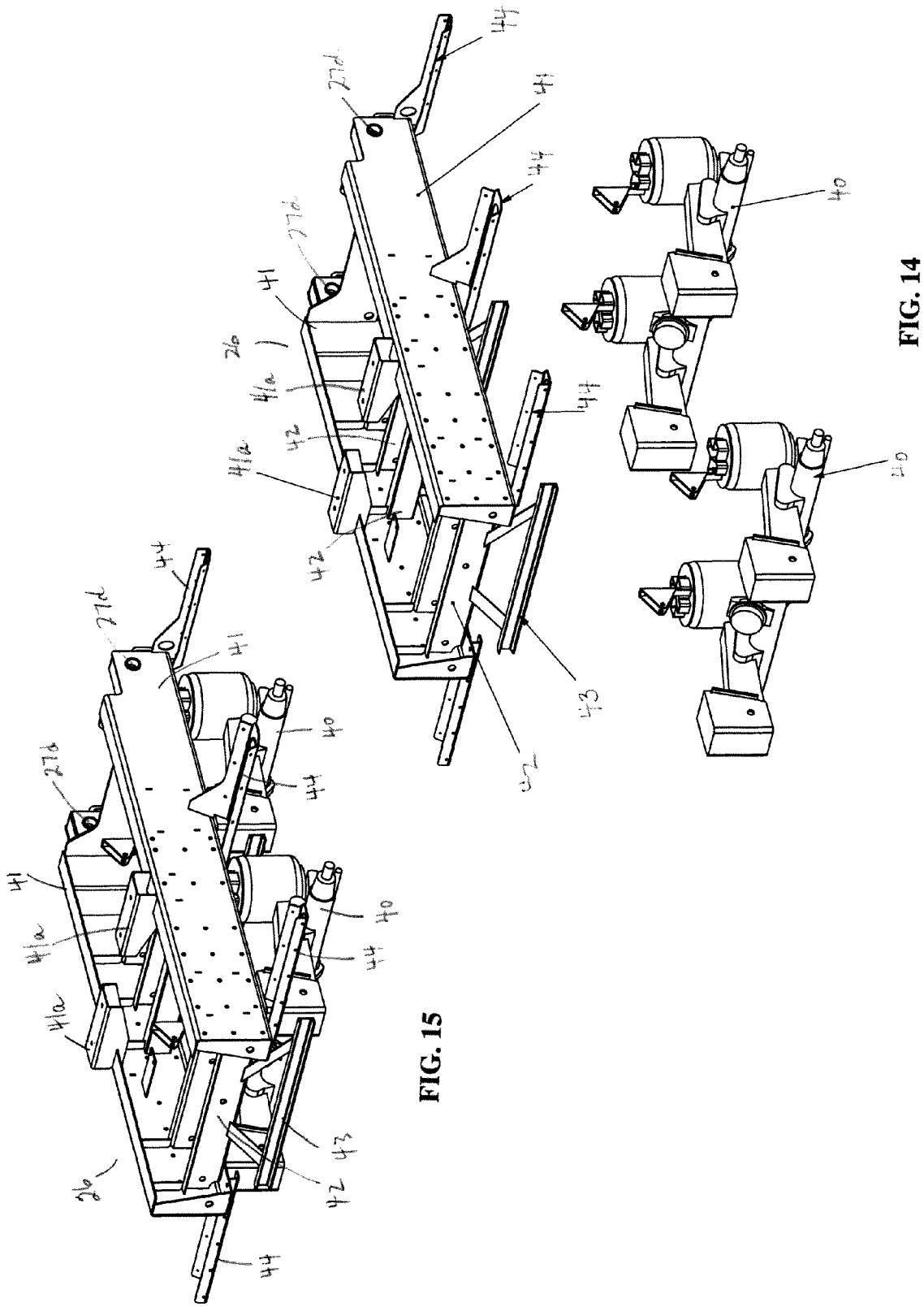

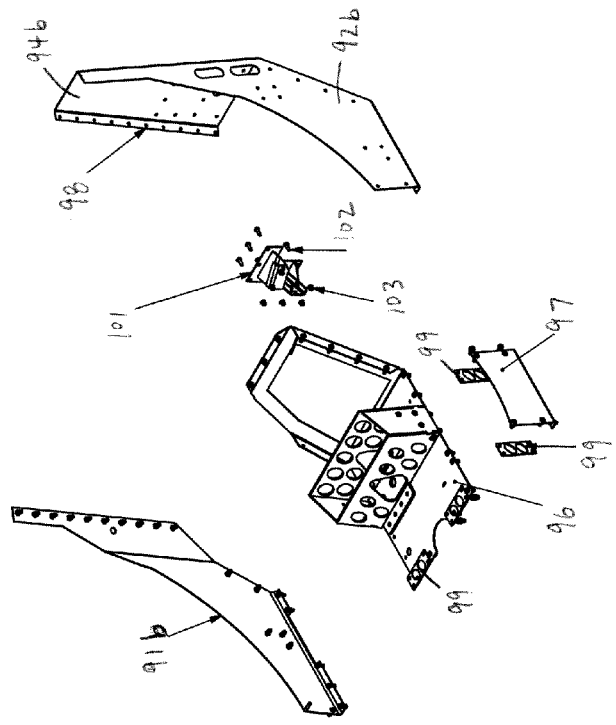
FIG. 29
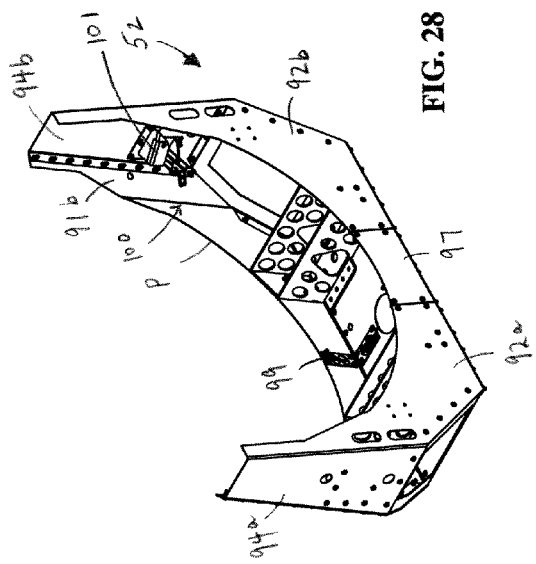
FIG. 28
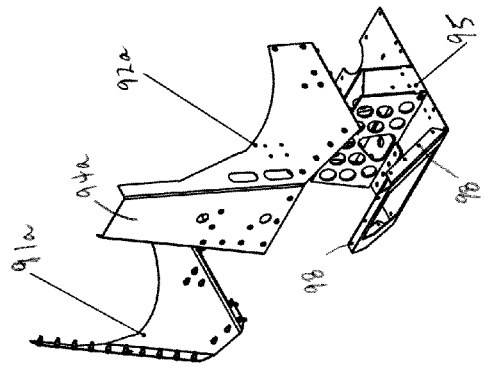

END DUMP TRAILER

BACKGROUND OF THE INVENTION

The present invention relates to an end dump trailer, a trailer frame assembly, a latch lift assembly for an end dump trailer, a radiused dump body and a method for forming a radiused dump body.

A semi end dump trailer is a tractor-trailer combination wherein the trailer itself contains the hydraulic hoist to lift the dump body. A typical semi end dump trailer (hereinafter "end dump trailer") has a 3-axle tractor pulling a 2-axle or 3-axle semi-trailer, however other axle combinations are possible. The tractor is equipped with a fifth wheel connection, including a fifth wheel locking mechanism, and the trailer includes a kingpin connection or kingpin assembly at its front connecting portion. The kingpin assembly is reinforced to transfer trailer load to the tractor and to transmit torsional/twisting loads from the trailer to the tractor. A key advantage of a semi end dump trailer is rapid unloading. A key disadvantage is that the trailer can be very unstable when raised in the dumping position, limiting its use in applications where the dumping location is uneven or off level. End dump trailer units (i.e., without the tractor drive unit) are configured for on-road travel, so have size dimensions which are within government road and highway regulations (on-road size regulations). Generally, the longitudinal length of the trailer may range between about 20-48 ft. and the transverse width of the trailer will typically be between about 8 and 9 ft. for on-road travel. A length to width ratio for an end dump trailer is generally in the range of 2.5:1 to 6:1, more typically in the range of 3.5:1 and 4.5:1.

The dump bodies of end dump trailers are supported on wheeled vehicles or frames which are generally categorized as full frame, quarter frame, or frameless. For the full frame type, an end dump trailer is typically constructed with a pivoting dump body hinged at its rear end to a chassis formed as a ladder frame. A ladder frame generally consists of two parallel steel I-beams spaced apart by multiple transverse structural steel reinforcing members (often termed cross members). The I-beams themselves are formed by welding, and the cross members are welded at multiple locations between the I-beams. This creates a heavy frame, and requires significant input by skilled welders. As well, a ladder frame provides limited stability control as the dump body is raised into its dumping position.

A frame termed a "unibeam" frame system is shown in U.S. Pat. Nos. 5,611,570 and 5,722,688 to Garcia. This frame is shown with long semi trailer trucks such as used to transport containers. The frame includes longitudinal and parallel spaced vertical members (termed unibeams), each having an inverse T-cross section, welded together at their top edges with a horizontal web termed a uniflange. A plurality of transverse cross members are included between the longitudinal members. The unibeam frame has not, to inventors' knowledge, been applied in the semi end dump trailer industry. The unibeam frame has a goal to provide a frame which accommodates flexure.

The hoist system most often used on most end dump trailers is comprised of a multiple-staged telescoping hydraulic cylinder mounted at the front of the chassis and connecting to the underside or to the top front portion of the dump body. This hoist system provides little or no contribution to stability of the end dump trailer in the raised dumping position, so uneven ground conditions may lead to tipping of the trailer. To provide the required tipping angle, which can be greater than 45 degrees to horizontal (ground), the hydraulic hoist is typically formed in multiple telescoping sections of four or more sections (termed stages). The multiple telescoping sections and long stroke generally prevent dual action over the full stroke. Single action telescoping cylinders, or multiple stage cylinders without full dual action, must use gravity for some or all of the stages to lower the dump body back to the lowered, horizontal position. This slows the dump cycle for the vehicle, particularly in cold weather.

The dump bodies of end dump trailers are available in many shapes ranging from rectangular dump boxes to dump bodies with radially curved floor and/or side panels. The radially curved floor/side panels are advantageous for faster and more complete dumping of bulk materials such as gravel, sand, asphalt, and aggregate. To form a radially curved floor panel, the steel is rolled into shape. Multiple curved panels are welded together, typically transverse to the direction of unloading, to form these curved floor panels. The welded joints of these curved panels make unloading more difficult as bulk materials, particularly sticky materials such as asphalt, resist gravity movement at the panel joints. To completely unload, the angle of the dump body may need to be increased even above 45 degrees, which can cause instability, particularly if the trailer is on uneven ground or if the payload of bulk materials is not uniformly distributed or shifts during travel or unloading.

One exemplary curved panel dump body is shown in U.S. Pat. No. 3,844,616 issued to Acker. A half-elliptical dump body is formed of sheet metal, presumably steel, and three arcuate sections are joined, presumably by welding, to a pair of vertical side walls. Acker does not specify whether the three arcuate sections are formed separately and welded longitudinally the length of the body, or are formed in one piece and welded transversely to a plurality of similar shaped sections. The dump body of Acker includes exterior bolsters on the sides of the dump body, about center of the body. The bolsters extend from the top rail to almost the bottom of the body.

Other exemplary curved dump bodies are shown in U.S. Pat. No. 5,431,475 to Perry; U.S. Pat. No. 5,482,356 to Goodson, Jr.; U.S. Pat. No. 6,637,808 to Ling et al.; U.S. Pat. No. 6,623,234 to Herring et al.; U.S. Published Patent Application 2008/00181135 to Risner. U.S. Pat. No. 6,490,772 to Deckert et al. describes schematically different ways to form a curved skip body using forms, rollers, presses or clamps. U.S. Pat. No. 6,931,720 to Thompson describes a forming press to fabricate a curved dump body.

Various types of interior or exterior reinforcement members and/or under frames are provided on these curved dump bodies to provide sufficient structural stability and strength. These reinforcement members and under frames add considerable weight to the dump body and also complicate the overall methods of fabrication. As well, rolling steel to form the curved panels required complicated steel rolling equipment.

Dump trucks and end dump trailers of the type which discharge the payload from the rear end of the dump body typically include a tailgate or end dump gate closing the end of the dump body. The gate is pivotally attached at its upper end to the dump body, allowing the gate to swing open and away from the dump body as the dump body is angled upwardly with the hoist. The lower end of the dump gate is generally released from or locked against the dump body by latch mechanisms on opposite sides of the dump body's rear end. Each latch mechanism may be a simple cradle catch located on the side of the dump body's rear end with a latch pin extending horizontally on each side of the dump gate. The latch mechanism may be mechanically operated, or more typically air or hydraulically controlled with actuators located on each side. Being exterior of the dump body, and in the path of the discharging payload of bulk materials, particularly a load of sticky asphalt, these latch mechanisms become coated with payload and road materials.

Improvement is needed in many aspects of dump trucks, particularly those of the end dump trailer type.

SUMMARY OF THE INVENTION

In accordance with the embodiments hereinafter described, a trailer frame assembly is provided for a fifth wheel trailer frame. The trailer frame assembly includes at least a portion of the frame which is torsionally stiffed with a rectangular closed section in a transverse cross section. The trailer frame assembly includes:

a pair of longitudinal, parallel spaced vertical side plates extending at least a portion of a length between the front portion and the rear portion of the trailer frame assembly, each side plate having a top portion and a bottom portion;

a top pan extending between the top portions of the spaced side plates, the top pan having opposed side edge portions;

a right angled top connecting wall formed on the top portion of each of the side plates or on each of the side edge portions of the top pan to provide opposed top overlap joints extending longitudinally along each of the side plates;

a bottom pan extending between the bottom portions of the spaced side plates, the bottom pan having side edge portions;

a right angled bottom connecting wall formed on the bottom portion of each of the side plates or on each of the side edge portions of the bottom pan to provide opposed bottom overlap joints extending longitudinally along each of the side plates;

a plurality of top fasteners extending through the top overlap joints to connect the top pan and the spaced side plates; and a plurality of bottom fasteners extending through the bottom overlap joints to connect the bottom pan and the spaced side plates;

such that the connected spaced side plates, the top pan and the bottom pan together form at least a portion of the trailer frame assembly, and provide a rectangular closed section in a transverse cross section.

In accordance with other embodiments, there is broadly provided an end dump trailer adapted to be raised and lowered with a dual acting lift cylinder mounted on each side of the end dump trailer. The end dump trailer includes:

a wheeled trailer frame adapted for connection to the tractor, the frame including a pair of longitudinal, parallel spaced vertical side members, each of the side members having opposed ends, and a lower lift cylinder mounting assembly connected on each side of the frame forwardly of a midpoint between the opposed ends;

a dump body including a closed front end, an open rear end, a floor, opposed side walls, and an upper rail connected at a top end of each of the side walls and extending longitudinally along each of the side walls, the dump body being hinged at the rear end to the frame for pivotal movement between a lowered position for loading and transporting bulk material and a raised position for dumping the bulk material from its open rear end;

a dump gate including an upper portion and a lower portion, the dump gate being horizontally pivotally connected at its upper end portion across the rear end of the dump body through a hinge assembly for movement between a closed position, wherein the dump gate closes the open rear end of the dump body, and an open position wherein the dump gate is swung rearwardly away from the open end of the dump body;

a pair of double acting lift cylinders connected on opposed sides of the dump body between the frame and the dump body for raising and lowering the dump body on the frame; a lower end of each of the lift cylinders being pivotally connected to one of the lower lift cylinder mounting assemblies, and an upper end of each of the lift cylinders being pivotally connected to the upper rail of the dump body at a point rearwardly of the lower lift cylinder mounting assembly such that each of the lift cylinders is angled generally rearwardly and upwardly from its lower end to its upper end.

In accordance with other embodiments, there is broadly provided a method of forming a dump body for an end dump trailer. The method includes:

i. providing a floor panel in a single, flat, seamless metal sheet, the floor panel having a front end, a rear end and opposed side edges;

ii. connecting a side wall panel along each of the opposed side edges of the floor panel, each side wall panel having a front end coextensive with the front end of the floor panel a rear end coextensive with the rear end of the floor panel, and opposed free edges;

iii. connecting or forming an upper rail along each of the free edges of the side wall panel, the upper rail having a polygonal cross sectional shape to provide structural strength;

iv. bending the connected floor panel, side wall panels and upper rails around a curved mandrel frame without rolling the floor panel, such that at least the floor panel has a radius of curvature;

v. clamping the connected floor panel, side walls and top rails to the curved mandrel from to maintain the radius of curvature;

vi. connecting a front body panel assembly to the upper rails and to the coextensive front ends of the floor panel and side walls to form a closed front end of the dump body;

viii. connecting a rear body panel assembly to the upper rails and to the coextensive rear ends of the floor panel and the side walls to form a rear end of the dump body; and ix. releasing the dump body from the curved mandrel frame, whereby the front body panel assembly and the rear body panel assemblies maintain the radius of curvature in the floor panel.

In yet other embodiments, there is provided an end dump trailer with a pair of novel latch lift assemblies for the dump gate. The end dump trailer includes:

a wheeled frame;

a dump body including a closed front end, an open rear end, a floor and opposed side walls, the dump body being supported on the frame and hinged at the rear end to the frame for pivotal movement between a lowered position for loading and transporting bulk material and a raised position for dumping the bulk material from its open rear end;

one or more lift cylinders between the frame and the dump body for raising and lowering the dump body on the frame;

a dump gate including an upper portion and a lower portion, the dump gate being horizontally pivotally connected at its upper end portion across the rear end of the dump body through a hinge assembly for movement between a closed position, wherein the dump gate closes the open rear end of the dump body, and an open position, wherein the dump gate is swung rearwardly away from the open end of the dump body; and a pair of latch lift assemblies, each connected at opposing sides of the dump body between the dump body and the dump gate, for latching the dump gate in the closed position, each latch lift assembly including;

a horizontal latch pin connected to the side of the dump gate;

an upwardly opening cradle catch connected to the side of the dump body to receive the latch pin, the cradle catch forming a rearwardly and upwardly inclined ramp portion to retain the latch pin in a latched position;

a linkage assembly pivotally mounted between the dump body and the hinge assembly such that rotation of the linkage assembly imparts a vertical upward movement to the dump gate sufficient for the latch pin to clear the ramp portion of the cradle catch for unlatching, while also permitting the horizontal pivotal movement to the dump gate; and an actuator connected between the dump body and the linkage assembly for rotating the linkage assembly.

BRIEF DESCRIPTION OF THE DRAWINGS

FIG. 3 is a side view of the end dump trailer of FIG. 1, showing the dump body in the raised, rearwardly tipping position, with the dual lift cylinders fully extended, the latch lift assemblies having vertically raised the dump gate, and the dump gate in the open position.

FIG. 4 is an enlarged view of the area in circle IV of FIG. 3, showing the lower end of the lift cylinder pivotally connected to a lift cylinder mounting assembly on the side plates of the frame assembly.

FIG. 5 is an enlarged view of the area in circle V of FIG. 3, showing the upper end of the lift cylinder pivotally connected to the upper rail of the dump body.

FIG. 8 is a side view of the frame assembly of FIG. 7.

FIG. 9 is a schematic sectional view taken through line A-A of FIG. 8, showing the top and bottom overlap joints at the side edge portions of the top and bottom pans, and showing a vertical cross plate fastened centrally between the top and bottom pans.

FIG. 10 is a schematic sectional view taken through line B-B of FIG. 8, showing the king pin assembly, and showing the U-rails over the top portion of the side plates of the closed section portion of the frame assembly.

FIG. 14 is a perspective view of the rear, tandem suspension assembly for connection rearwardly of the closed section portion of the frame assembly, with some parts shown in exploded view.

FIG. 15 is a perspective view of the assembled rear, tandem suspension assembly of FIG. 14.

FIG. 28 is a perspective view of the body rear panel assembly for attachment to the rear end of the dump body while the floor panel is held in the radiused shape shown in FIG. 25.

FIG. 29 is a perspective view of the body rear panel assembly of FIG. 28, with the components shown in exploded view.

DETAILED DESCRIPTION OF THE INVENTION

Figure 1:
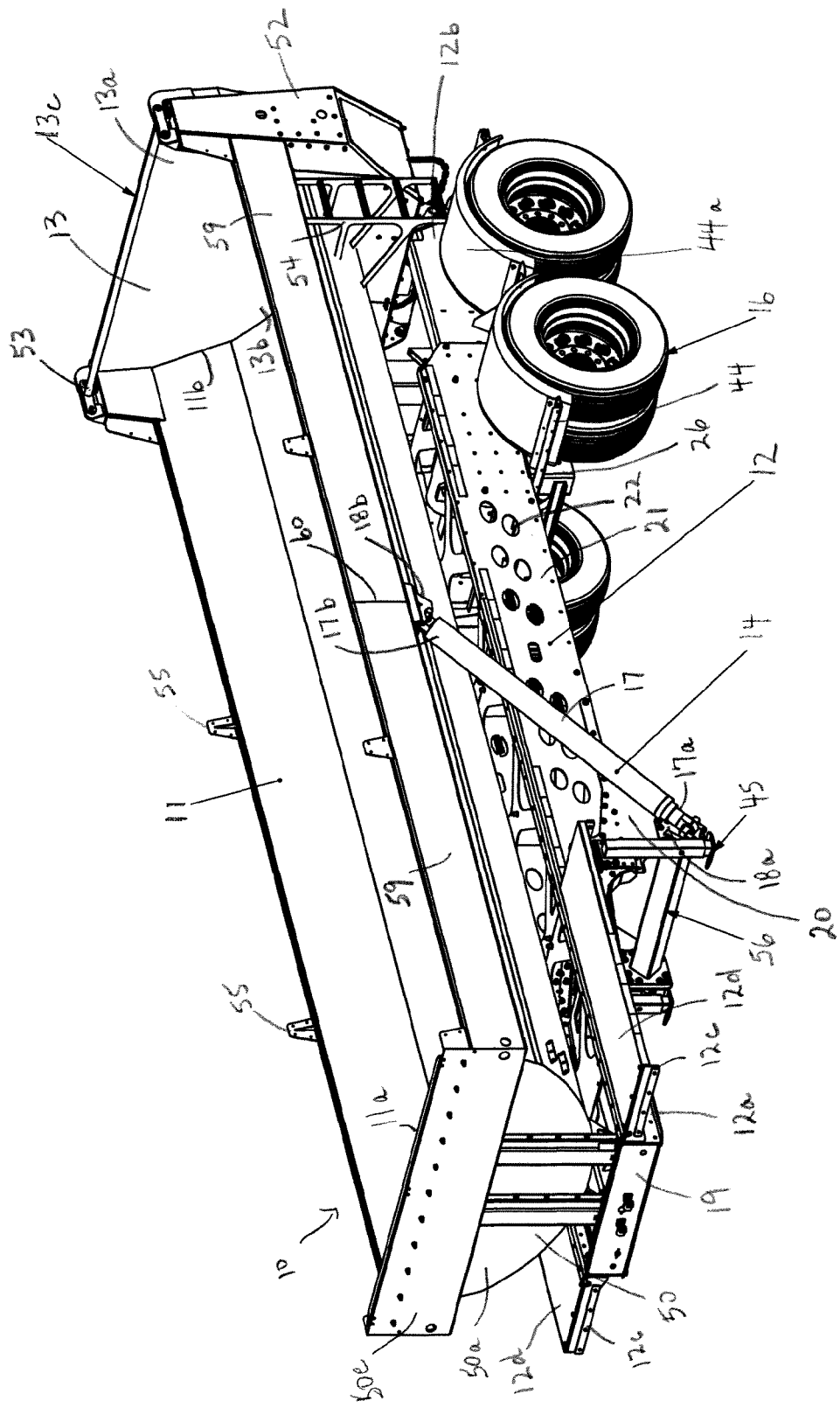
FIG. 1 is a perspective view of one embodiment of the end dump trailer, showing a two axle, wheeled trailer frame assembly which is closed section along part of its length, and showing a fifth wheel kingpin assembly at its front portion. A dump body having a radiused (curved) and seamless floor panel is mounted for pivotal movement to a rear portion of the frame assembly. Dual lift cylinders, one on each side of the dump body, move the dump body into its raised position. A dump gate is pivotally connected at its upper end to the rear end of the dump body. A rear body panel assembly houses a latch lift assembly on each side for latching/unlatching the dump gate in its closed position when the dump body is in its lowered position.

An end dump trailer 10, a closed section frame assembly 12, a dump body 11 with a radiused floor panel 51 and method of forming same, a dual lift cylinder assembly 14, and a pair of latch lift assemblies 15 for the dump gate 13, may be understood by reference to the following description taken in conjunction with the accompanying drawings.

Figure 2:
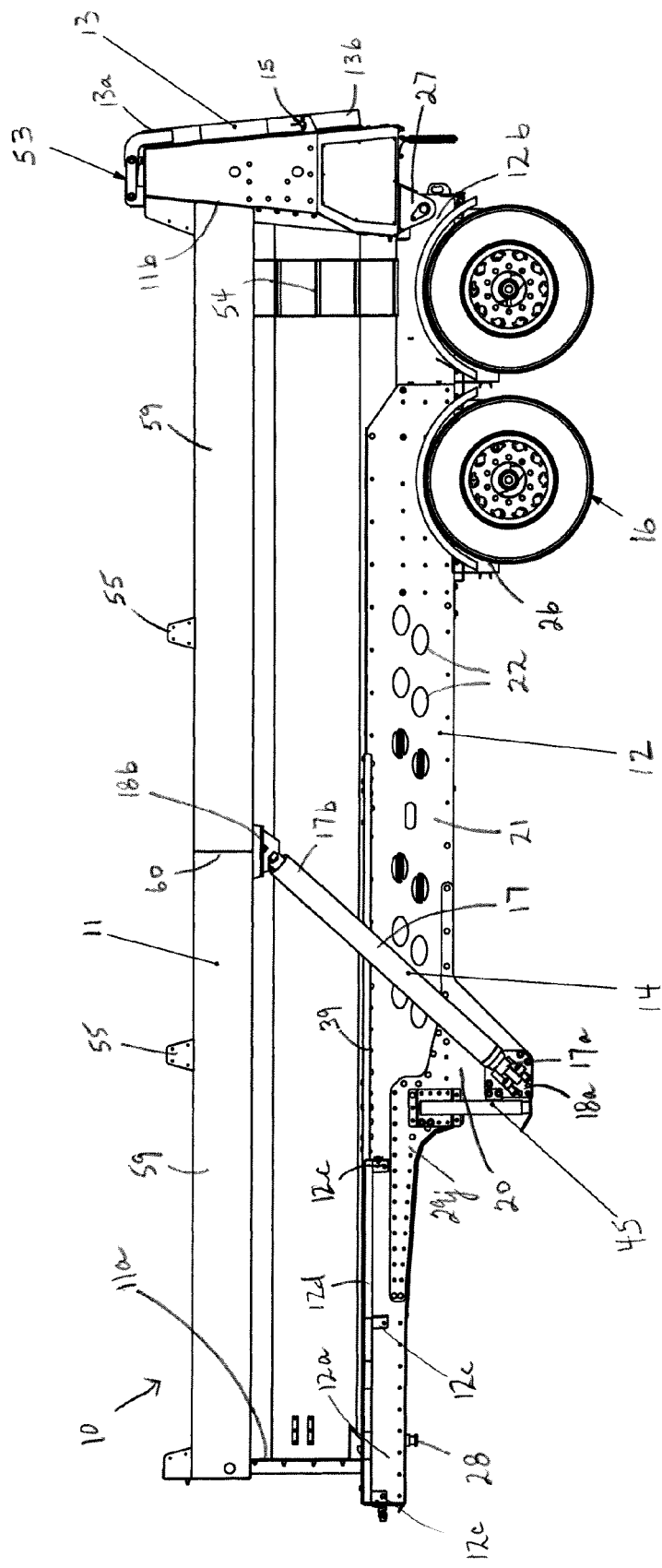
FIG. 2 is a side view of the end dump trailer of FIG. 1, with the dump body in the lowered position.

Referring to FIGS. 1, 2, the end dump trailer 10 is comprised of components described more fully below, including:

an open top and open rear dump body 11 with a closed front end 11a, and an open rear end 11b, for transporting bulk material payloads such as gravel, sand, asphalt, and aggregate;

a supporting wheeled frame assembly 12 with a front portion 12a and a rear portion 12b, at least a portion of the frame assembly 12 having a rectangular closed section in a transverse cross sectional view;

a rear body tipping hinge assembly 27 attached at the rear end 11b of the dump body 11 and at the rear portion 12b of the frame assembly 12;

a dual lift cylinder assembly 14 to rotate the rear hinged dump body 11 between a lowered, horizontal position for loading and transporting bulk material and a raised, tipping position for dumping the bulk material from the open rear end 11b of the dump body 11;

an end dump gate 13 having an upper portion 13a, and a lower portion 13b;

a horizontal gate hinge assembly 53 attaching the dump gate 13 to the dump body 11 at the upper portion 13a of the dump gate 13; and a pair of latch lift assemblies 15 controlling the latching and unlatching between the dump body 11 and the dump gate 13 (latch lift assembly 15 shown in FIGS. 30-33).

FIGS. 3-5 shows the dump body 11 in the raised, and rearwardly tipping position. The dual lift cylinder (hoist) assembly 14 is described more fully below, but briefly includes a pair of lift actuators such as hydraulic lift cylinders 17 of one or more stages (for example one, two or three stages, depending on size, tipping angle, and applications for the end dump trailer 10). The lift cylinders 17 are double acting (i.e., dual). Each of the lift cylinders 17 is supported at a lower end 17a (piston end) by the wheeled frame assembly 12 though lower lift cylinder mounting assembly 18a. The lower end 17a is pivotally connected to the frame assembly 12 through this assembly 18a. The upper end 17b (cylinder end) of each lift cylinder 17 is pivotally connected through an upper lift cylinder mounting assembly 18b to an upper rail 59 of the dump body 11. The dump gate 13 is shown unlatched and open to allow bulk material to be dumped by nature of gravity forces. At the widest point, the upper rails 59 of the dump body 11 are positioned in a vertical plane which is spaced outwardly compared to the vertical plane containing the lower lift cylinder mounting assembly 18a. The pivotal connections (ex. spherical ball joints) at each of the cylinder ends 17a, 17b allow pivotal movement in at least two planes, such that the lift cylinders 17 may be angled generally rearwardly, upwardly and outwardly from the lower ends 17a to the upper ends 17b as they span the distance between the upper rails 59 and the lower lift cylinder mounting assembly 18a.

Trailer Frame Assembly with Closed Section for Torsional Stiffness

FIGS. 1-14 show a first embodiment of the wheeled frame assembly 12 showing a two axle (tandem rear suspension) application in which the closed section portion of the frame assembly ends forwardly of the rear suspension area. FIGS. 34-38 show a second embodiment of a wheeled frame assembly 212 showing a three axle rear suspension application in which the closed section portion of the frame assembly extends through the rear suspension area. Either embodiment may be adapted to accommodate fewer or greater number of axles. In the second embodiment, like parts to the first embodiment are generally not described in detail. Although herein illustrated with an end dump trailer embodiment, the frame assemblies 12, 212 have broader application to other truck and/or trailer frame applications.

The end dump trailer 10 has long axes (front to rear along the length), herein termed "a longitudinal axis". The term "longitudinal" as used herein and in the claims thus refers a position, orientation or movement along a longitudinal axis. The terms "transverse" or "cross" as used herein and in the claims refer to a position or orientation along an axis generally perpendicular to, and between, parallel spaced longitudinal axes of the end dump trailer 10. The terms "front" or "forward" as used herein and in the claims refer to a position or orientation proximate the tractor connecting end of the end dump trailer 10, or movement or inclination in a direction toward the tractor connecting end of the end dump trailer 10. The terms "rear" or "rearward" as used herein and in the claims refer to a position or orientation proximate the rear, gated discharge end of the end dump trailer 10, or movement or inclination in a direction toward the rear, gated discharge end of the end dump trailer. The terms "side" as used herein and in the claims refers to spaced apart side members, such as side walls of the dump body 11, or side plates of the frame assembly 12. The term "outward" as used herein and in the claims refers to a position, orientation, surface, movement or inclination which faces away from a side member, or is in a direction away from a side member, for example generally perpendicular to a longitudinal axis. The term "inward" as used herein means opposite of outward. The term "horizontal" as used herein and in the claims generally refers to an a position, orientation, a plane or a rotational plane parallel to level ground, such as a position or plane when the dump body 11 is in a horizontal, lowered position. The term "vertical" as used herein and in the claims generally refers to a position, orientation or plane perpendicular to level ground. The terms "upward" and "downward" as used herein and in the claims are generally used relative to level ground.

With reference to FIGS. 1-14, the front portion 12*a* of the frame assembly 12 includes a kingpin assembly 19 (see FIG. 13) for connecting to the pulling tractor (not shown). The rear portion 12*b* of the frame assembly 12 accommodates ground engaging wheels 16 and a rear suspension assembly 26 for one or more axle applications.

Figure 6:
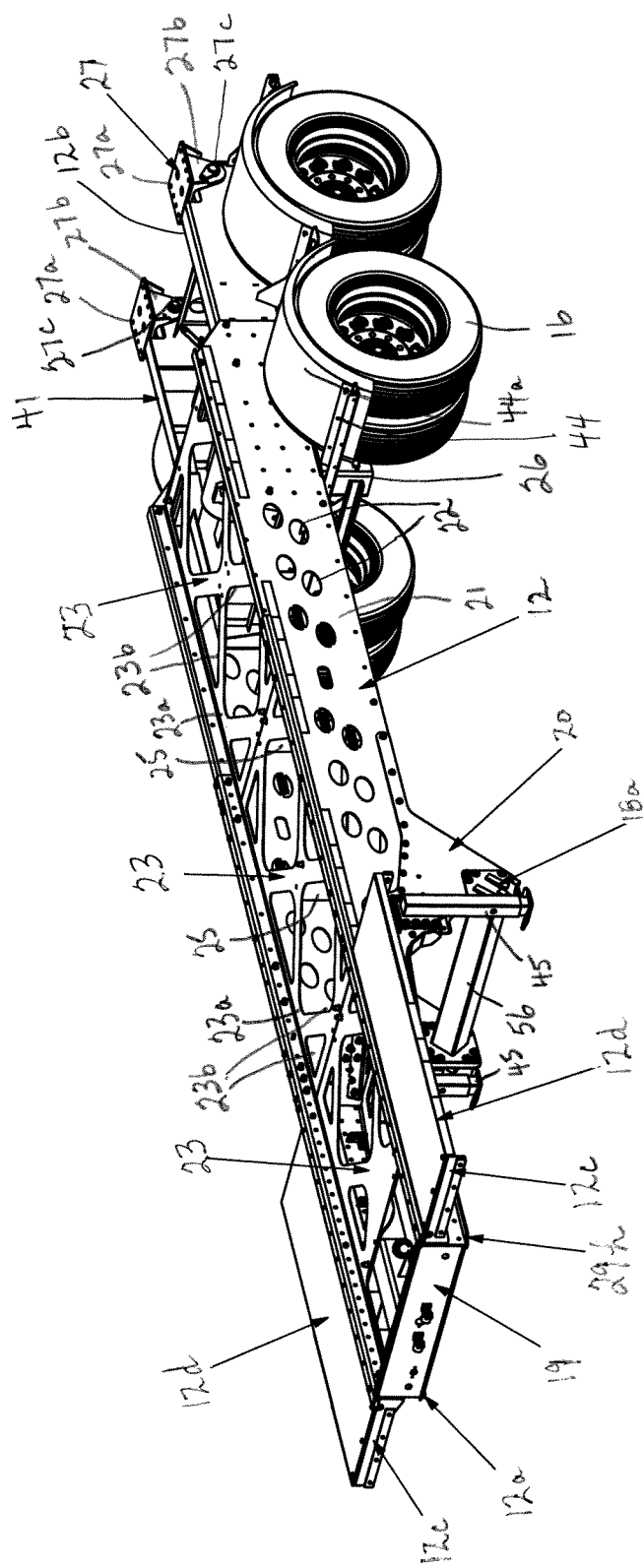
FIG. 6 is a perspective view of the frame assembly of FIG. 1 with the dump body and dual lift cylinders removed, showing the dump body tipping horizontal hinge assembly for the dump gate at the rear portion of the frame assembly, and showing the closed section portion of the frame assembly extending forwardly of a rear axle, suspension assembly.
Figure 7:
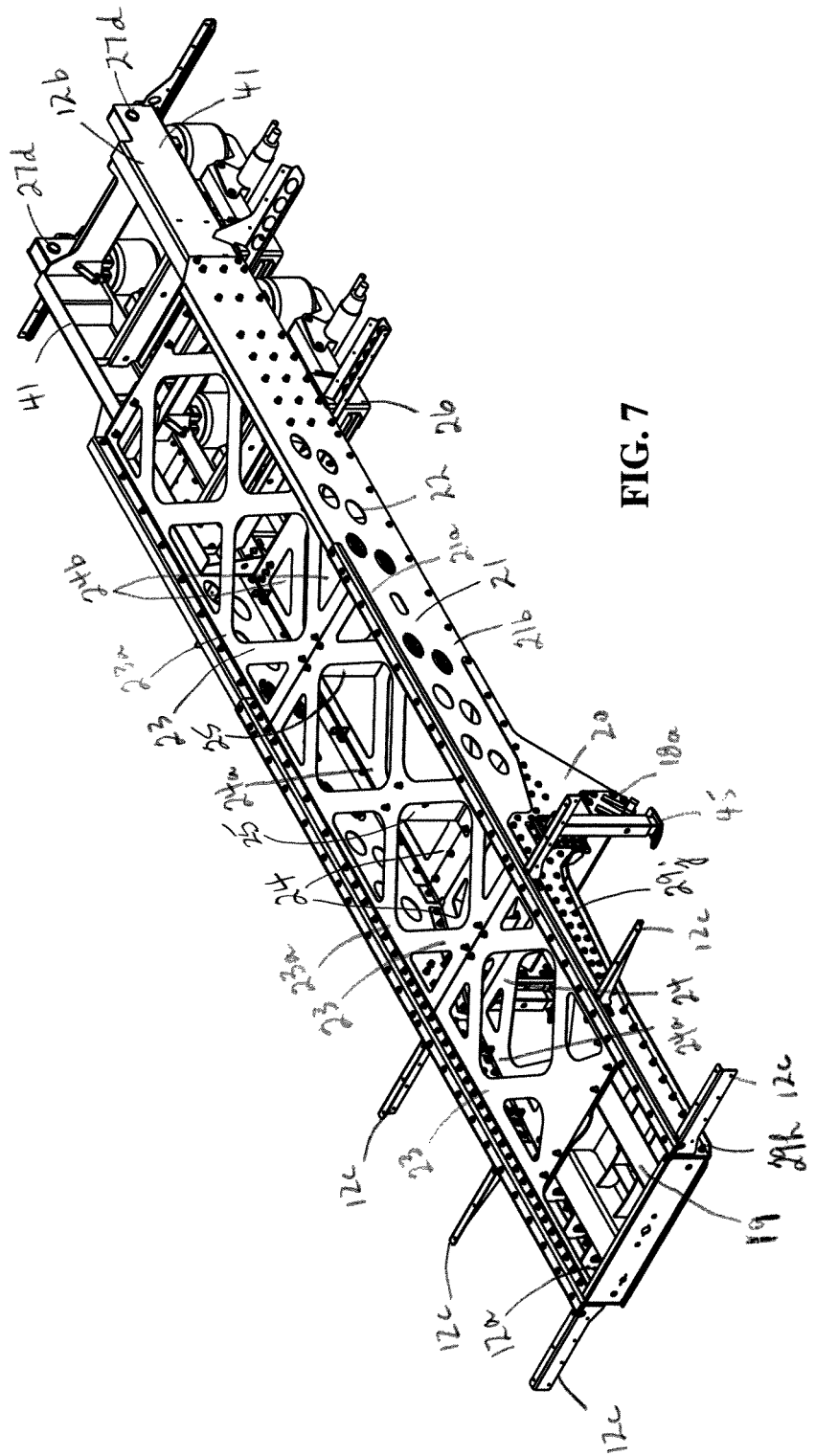
FIG. 7 is a perspective view of the frame assembly of FIG. 6, with the wheels and fenders removed to show the side plate, top pan, bottom pan closed section details of the closed section portion of the frame assembly.
Figure 11:
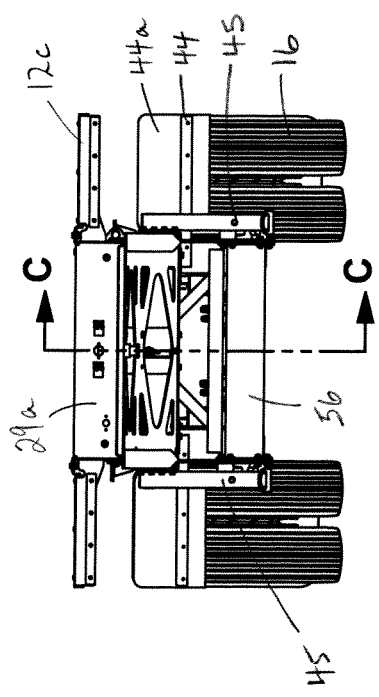
FIG. 11 is an end view of the frame assembly of FIG. 6.
Figure 12:
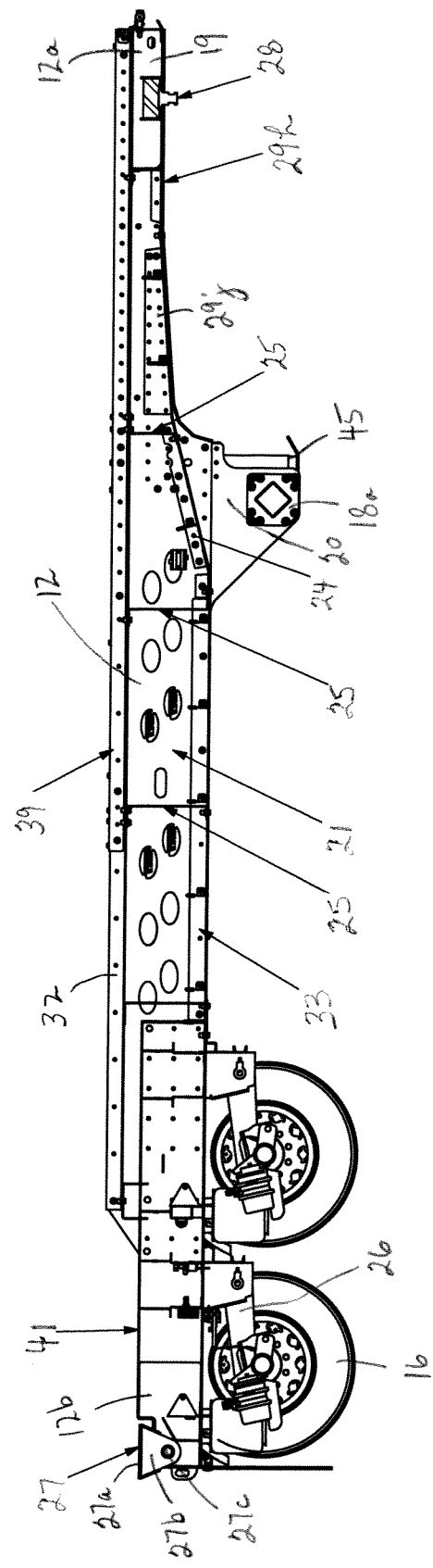
FIG. 12 is a schematic sectional view taken along line C-C of FIG. 11.

In FIGS. 6-14, the dump body 11 and cylinders 17 are removed to show the components of the frame assembly 12. FIG. 7 has the fenders and wheels removed to better show frame assembly details. Structural vertical side plates 21 which are parallel spaced apart, and extend longitudinally at least a portion of the longitudinal length from the front portion 12*a* toward the rear portion 12*b* of the frame assembly 12. The frame assembly 12 also includes a generally horizontal upper pan 23 extending between top portions 21*a* of the side plates 21, and a generally horizontal bottom pan 24 extending between bottom portions 21*b* of the side plates 21. The top pan 23 has opposed side edge portions 23*a*, and bottom pan 24 has opposed side edge portions 24*a*. While the pans 23, 24 are generally horizontal, they may be inclined (or bent) upwardly or downwardly to accommodate reduced and/or increased height areas of the side plates 21, such as at the front kingpin assembly 19, or at the rear suspension assembly 26. Thus, as used herein and in the claims, the term "generally horizontal" with respect to pans 23, 24 is meant to include inclined or bent portions in the pans 23, 24. The top and bottom pans 23, 24 may be formed in a single sheet or in a plurality of sections between the front and rear portions 12*a*, 12*b*. In the Figures, the top and bottom pans are shown in sections, with each section being labeled as 23 or as 24. The sections may be formed with connecting flanges to connect the sections together with transverse joints (best seen at 225 in FIG. 34). The sections of pans 23, 24 also assist in accommodating the reduced/increased height areas of the side plates 21.

A number of vertical pan support plates 25 (shown as cross plates in the figures) are connected between the top and bottom pans 23, 24. The vertical pan support plates are shown as being oriented perpendicular to the longitudinal axis, but other vertical orientations between the top and bottom pans 23, 24 may be used. The vertical pan support plates 25 provide vertical structural support between the top and bottom pans 23, 24 of the frame assembly 12.

The frame assembly 12 is shown with conventional front fender brackets 12*c* and front fenders 12*d*, extending outwardly from, and connected to, the side plates 21.

FIG. 9 is a schematic, transverse cross-section taken along line A-A of FIG. 8 through the frame assembly 12 to show the rectangular closed section construction in the frame assembly 12. This rectangular closed section may be included for the entire length of the frame, or for a portion, for example a front half portion, or middle half portion, or more than a half portion of the frame assembly 12. Other portions of the frame assembly 12, such as at the front and/or rear portions 12*a*, 12*b*, may be constructed without the rectangular cross section, such as using known ladder frame construction. The rectangular closed section construction is defined by the vertical side plates 21 and the top and bottom pans 23, 24. The rectangular closed section portion of the frame assembly 12 provides substantial resistance to transverse bending and provides torsional stiffness in the longitudinal direction to withstand torsional forces applied by dead and live lifting loads for an end dump trailer. This rectangular closed section is accomplished by fastening the horizontal upper and lower pans 23, 24 between the vertical side plates 21 at the upper and lower portions 21*a*, 21*b* of the side plates 21. The mode of fastening is described in greater detail below. It will be understood that the rectangular closed section portion of the frame assembly 12 does not include the structural I-beams used in conventional ladder frames, nor does it include the T-shaped beams of the unibeam frames mentioned in the prior art. As well, welding of the closed section frame components 21, 23 and 24 is not needed, as threaded (example bolts) and/or rivet fasteners may be used.

Vertical side plates 21 may be continuous or have cut-out portions 22 (ex. shaped holes, such as round or oval holes of material removed from the plates) to reduce material and weight from the frame assembly 12 while maintaining the structural properties. Top and bottom pans 23, 24 may be continuous pans, or as shown in the Figures, may have cut out portions 23*b*, 24*b*, such as large triangular or diamond-shaped holes. Other shaped cut out portions may be used, such as rectangular cut out portions, although generally triangular and/or diamond cut outs are advantageously used for structural strength. The cut out portions 23*b*, 24*b* result in a lattice geometry, or a truss-like structure, with the side edge portions 23*a*, 24*a* intact. The cut out portions 23*b*, 24*b* reduce material and weight from the pans 23, 24 (and thus from the frame assembly 12), while preferably creating a triangulated lattice geometry which maintains strength and torsional stiffness in the frame assembly 12.

Vertical side plates 21 and pans 23, 24 may be formed from plate or sheet carbon steel, plate or sheet aluminum, or a combination of plate or sheet aluminum and steel. For greatest structural properties, each of the side plates 21, at least for the closed section portion, are formed in a continuous section from a single sheet or plate of steel, such as high tensile 4.5 mm steel. The pans 23, 24 may be formed in sections, joined together along the length of the frame assembly 12, for example from 6 mm high tensile steel. For greatest structural properties, the pans 23, 24 are formed from steel sheets or plates. Sectional pans 23, 24 are particularly useful to accommodate reduced and/or increased height portions of the side plates 21, as is evident from the figures.

As best shown in FIG. 9, the side plates 21 and the top and bottom pans 23, 24 are connected together through opposed top overlap joints 30 and opposed bottom overlap joints 31 (i.e., top pan side edge portions 23*a* and top side plate portions 21*a* overlap one another with parallel overlapping portion, and bottom pan side edge portions 24*a* and bottom side plate portions 21*b* overlap one another with parallel overlapping portion). The overlap joints 30, 31 may be formed at the side edge portions 23*a*, 24*a* of the top, bottom pans 23, 24, for example by forming right angle bends, or by attaching right angle brackets (latter not shown). The overlap joints 30, 31 may alternatively be formed at the top and bottom portions 21*a*, 21*b* of the vertical side plates 21 by forming right angle bends, or by attaching right angle brackets (latter not shown). In this manner, the right angle bends or right angle brackets form top and bottom connecting walls or flanges to provide the top and bottom overlap joints 30, 31. In the exemplary embodiment of FIG. 9, the top pan 23 has side edge portions 23*a* providing a right angled top connecting wall 32 formed with a right angle bend so that the top connecting wall 32 is oriented parallel to the side plates 21. The bottom pan 24 has side edge portions 24*a* providing a right angled bottom connecting wall 33 formed with a right angle bend so that the bottom connecting wall 33 is oriented parallel to the side plates 21. In FIG. 9 the top and bottom connecting walls 32, 33 are formed to be positioned to overlap at inwardly facing surfaces 34 of the side plates 21, however, overlap at outwardly facing surfaces 35 of the side plates 21 may also be used. Top fasteners 36 (shown as dots along top portion 21*a* of side plate 21 in FIG. 8) extend through the top overlap joints 30 to connect the top pan 23 and the side plates 21. Bottom fasteners 37 (shown as dots along bottom portion 21b of side plate 21 in FIG. 8) extend through the bottom overlap joints 31 to connect the bottom pan 24 and the side plates 21.

While welding or adhesive connections may be used at the overlap joints 30, 31, the top and bottom fasteners 36, 37 are most advantageously threaded or rivet fasteners connected through aligned holes formed by laser, plasma or mechanical drilling through the overlap joints 30, 31. Exemplary threaded or rivet fasteners include bolts and nuts, lock bolts, and rivets such as HUCK® (TM of Alcoa Inc.) rivets. Although not fully labeled in the Figures, it will be understood that dots appearing in the Figures generally represent threaded or rivet fasteners, and small holes appearing in the Figures are drilled for threaded or rivet fasteners. In the event of welding in the frame assembly, known techniques of electric metal deposition welding or electric resistance welding may be used.

For some applications of the frame assembly 12, additional structural support may be added, for example the vertical pan support plates 25 between the top and bottom pans 23, 24. FIGS. 9, 10 shows a top flange 38 formed at the side edge portions 23a of the top pan 23, formed as a further right angled bend so as to extend horizontally above and outwardly from the side plates 21. A downwardly opening U-shaped rail 39 may be connected over the top portion 21a of each of the side plates 21. The U-shaped rail 39 may extend along part or all of the length of the side plates 21. In the Figures, the U-shaped rail 39 extends over at least the front half of the length of the side plates 21, where the transverse bending loads are high. Threaded or rivet fasteners may be used, extending through the U-shaped rail 39 and the top flange 38, to connect the U-shaped rail 39. Alternatively welding or adhesives may be used to connect the U-shaped rails 39. The U-shaped rails 39 may be replaced by other upper longitudinal structural members such as angled or flat flanges, whether formed integrally with, or separately from, one or both of the side plates 21 and the top pans 23.

It will be understood that the overlaps joints 30, 31, the top and bottom connecting walls 32, 33, the top flanges 38, the U-shaped rails 39, and the vertical pan support plates 25 all contribute to overall strength of the closed section portion of the frame assembly 12, making it ideally suited for end dump trailer applications and other applications. The use of threaded or rivet fasteners to connect together the closed section portion of the frame assembly provides a faster and more economical manufacturing process for the frame assembly compared to welded I-beams and ladder frame construction of the prior art. Cut out portions 23b, 24b in the pans 23, 24 allow for lighter weight frame construction, while relying on the closed section portions for torsional stiffness and mechanical strength.

As described above, a number of vertical pan support plates 25 may be spaced through the frame closed section cross-section portions to provide strength to the top and bottom pans 23, 24. The vertical pan support plates 25 may be formed from steel or aluminum plates, with steel providing the greatest strength. The vertical pan support plates 25 may be formed with top and bottom flanges 25a, 25b, for example by forming or attaching right angle bends or brackets at the top and bottom edges (see FIG. 9). Threaded or rivet fasteners 25c are shown in FIG. 9 extending through the flanges 25a, 25b and through the pans 23, 24. The vertical pan support plates 25 may be generally centrally located between the side plates 21, as shown in the Figures to best support the top and bottom pans 23, 24. As above these vertical pan support plates may be longitudinally oriented between the top and bottom pans 23, 24 (not shown in figures). The vertical pan support plates 25, whether oriented transversely or longitudinally between the top and bottom pans, increase stiffness and resistance to buckling of the top, bottom pans 23, 24 under conditions of high bending or torsional loading, such as occur during dumping operations in an end dump trailer 10.

FIGS. 6, 7 and 8 also shows a body tipping hinge assembly 27 at the rear portion 12b of the frame assembly. In FIG. 9, the hinge assembly 27 is located at the rear end of the rear suspension assembly 26. The hinge assembly 27 has a horizontal rotational axis parallel to the rotational axis of the road wheels 16. The hinge assembly 27 allows for the raising and lowering of dump body 11 by the dual lift cylinder assembly 14. The hinge assembly 27 includes horizontal mounting plates 27a for connection to the rear end 11b of the dump body 11 such as by bolting, vertical spaced apart hinge side plates 27b extending downwardly from the mounting plates 27a, and horizontal hinge pins 27c extending through the hinge pivot holes 27d (see FIG. 7) formed through the side rails 41 of the rear suspension assembly 16.

Figure 13:
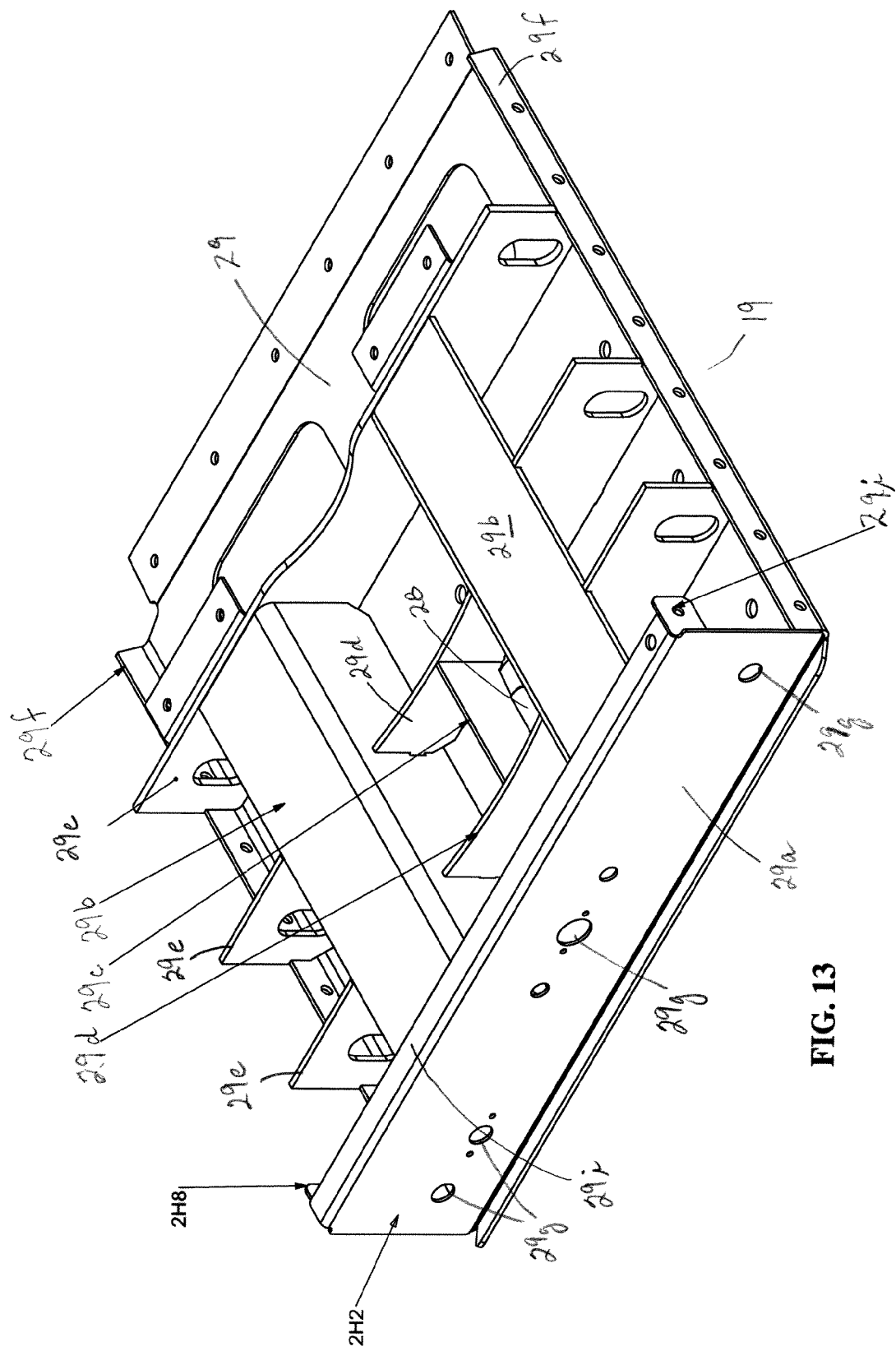
FIG. 13 is a perspective view of the king pin assembly for connection at the front portion of the frame assembly.

FIGS. 10 and 13 show details of the kingpin assembly 19. The kingpin area of the frame assembly 12 experiences high torsional/twisting loads, so is heavily reinforced. The side plates 21 have a reduced height at the front portion 12a of the frame assembly 12 to accommodate the tractor, and the kingpin assembly 19 is mounted between the side plates 21 in this reduced height area. The kingpin assembly includes downwardly extending kingpin 28, upper fifth wheel horizontal plate 29 (functions as bottom pan 24) formed with upturned side flanges 29f for connecting to the side plates 21, a transverse kingpin front plate 29a, dump body landing plates 29b, kingpin longitudinal reinforcing member 29c, kingpin transverse reinforcing members 29d, and transverse reinforcing members 29e. Kingpin 28 engages the fifth wheel locking mechanism (not shown) of a semi-tractor and transfers tractive forces to the end dump trailer 10. The horizontal portion of plate 29 rests on the semi-tractor fifth wheel (not shown) and supports the vertical trailer load as well as transmits torsional/twisting loads from the end dump trailer 10 to the semi-tractor. The kingpin front plate 29a includes top flanges 29i. The frontmost top pan section 23 is cut away in a central portion over the kingpin assembly 19, leaving its side edge portions 23a extending forwardly over the kingpin assembly 19 (see FIGS. 7 and 10). The side edge portions 23a of this frontmost top pan 23 connect to a top flange 29i of the kingpin front plate 29a. The kingpin assembly 19 forms a box-like reinforced structure which can be connected between the side plates 25 of the frame assembly 12, for example with threaded or rivet fasteners, or by welding or adhesives. As above, dots appearing in the Figures represent threaded or rivet fasteners, and small holes appearing in the Figures, such as shown in side flanges 29f are drilled for threaded or rivet fasteners. The front kingpin plate 29a is formed with multiple holes 29g to allow for electrical, hydraulic or air connections through to other components of the end dump trailer 10. For additional strength in the king pin assembly area, a bottom flange 29h is connected to the lower portion 21b of the side plates 21, such as by welding. The bottom flange 29h may be replaced by other bottom longitudinal support members such as angled or flat flanged formed integral with, or separately from, one or both of the side plates 21 and the bottom pan 24. As well, extending rearwardly from the area of the kingpin assembly 19 toward the landing gear 45, a curved side plate member 29j is connected to the outwardly facing surfaces of each of the side plates 21, and extends outwardly toward the landing gear leg 45, to strengthen the frame assembly 12 in the landing gear area.

FIGS. 14, 15 show a typical rear tandem axle suspension assembly 26 including two axle assemblies 40 and a structural frame having longitudinal, spaced apart side rails 41 (C-shaped), which can be connected through upper mounts 41a to the top pan 23, between the side plates 21 of the frame assembly 12, for example by threaded or rivet fasteners or by welding. In the Figures, the rear suspension assembly 26 is connected rearwardly of the side plates 21, such that only the forward portion of the frame assembly 12 forms a closed section in transverse cross section. In the second embodiment of FIGS. 34-38, the rear suspension assembly 226 is connected within the side plates 21 to extend the closed section of the frame through the rear suspension. The rear suspension assembly 26 includes multiple and lateral cross members 42, 43 arranged parallel to the rotational axis of the road wheels 16. Peripheral equipment such as splash fenders 44a and mud flaps (not shown) may be attached to mounting brackets 44. The number of axles can be decreased or increased, as known in the art. The suspension shown in the Figures is a Reyco Granning® 23 K Air Ride air suspension system, which is representative of conventional types of air suspension, and thus art known components are not separately labeled as they are well understood by persons skilled in the art. Although air suspension is shown, it should be understood that other types of rear suspension assemblies might be used, for example leaf spring suspension.

FIGS. 34-38 show a three axle frame assembly 212 with the full length of the frame assembly 212 being formed with vertical side plates 221, each formed from a single plate of steel. Like parts to the first embodiment are not all described herein, as the details will be apparent based on the above description and the Figures. The top pans 223 extend along the full length of the frame assembly rearwardly of the king pin assembly 219. The bottom pan sections 224 extend along the length of the frame assembly 212 rearwardly from the king pin assembly 219 to the rear suspension assembly 226. Vertical pan support plates 225 extend between the pans 223, 224. The rear suspension assembly 226, which is a conventional triple axle air suspension assembly, is connected between the side plates 221, for example with threaded or rivet fasteners, and/or with welding. While shown for a three axle frame assembly, this embodiment may be adapted to frame applications with fewer or more axles. Rear suspension subassemblies 254 bolt to the underside of the frame assembly 212 through mounting plates 261, and include air suspension axle assemblies 240, connected to cross tube supports 256. Alternatively, the rear suspension assembly 226 may be welded or riveted. Threaded or rivet fasteners throughout the rear suspension 226 under the frame assembly 212 between the side plates 221 reduces the labour and material needed for the overall frame construction. Cross tube supports 256 provide upper mount plates 258 for the air suspension airbags 260. Cross tube supports 256 bolt to the underside of the frame assembly 212 through the side plates 221 and the bottom pans 224. Throughout area of the rear suspension assembly 226, the vertical pan support members are shown as flanged vertical frame cross members 259 extending between the side plates 221 and being connected to the side plates 221 and to the top pan 223, for example with threaded or rivet fasteners, or by welding. The bottom pans 224 are shown to be longitudinally spaced apart in the area of the rear suspension assembly 226 to accommodate and connect to the flanged vertical frame cross members 259. The bottom pans 224 are connected to the outward facing surfaces shown at 235 of the side plates 221. The flanged vertical frame cross members 259 in the rear suspension area provide rigid mounting points for the cross tube supports 256.

Rear tipping hinge assembly 227 is formed separately from frame side plates 221 (see FIG. 35), and is connected with threaded or rivet fasteners, or by welding, to the extreme rear end portion 212b of the frame assembly 212. The hinge assembly 227 includes side members 262, cross member 263 extending between side members 262, and hinge pivot holes 265 formed through the side members 262 in an area that is reinforced to strengthen the pivot point.

Frame assemblies 12, 212 formed with full length or partial length rectangular closed sections as described herein are preferable to conventional full length ladder frames by providing better torsional stiffness and stability for an end dump trailer 10. The closed section frame assemblies 12, 212 may be used with trailers other than end dump trailers. As well, other known wheeled frames such as a ladder frame may be used with other components of the end dump trailer 10 described herein, including the radiused dump body 11, the dual lift cylinder assembly 14 and the latch lift assembly 15.

Dump Body with Radiused Floor Panel

Figure 16:
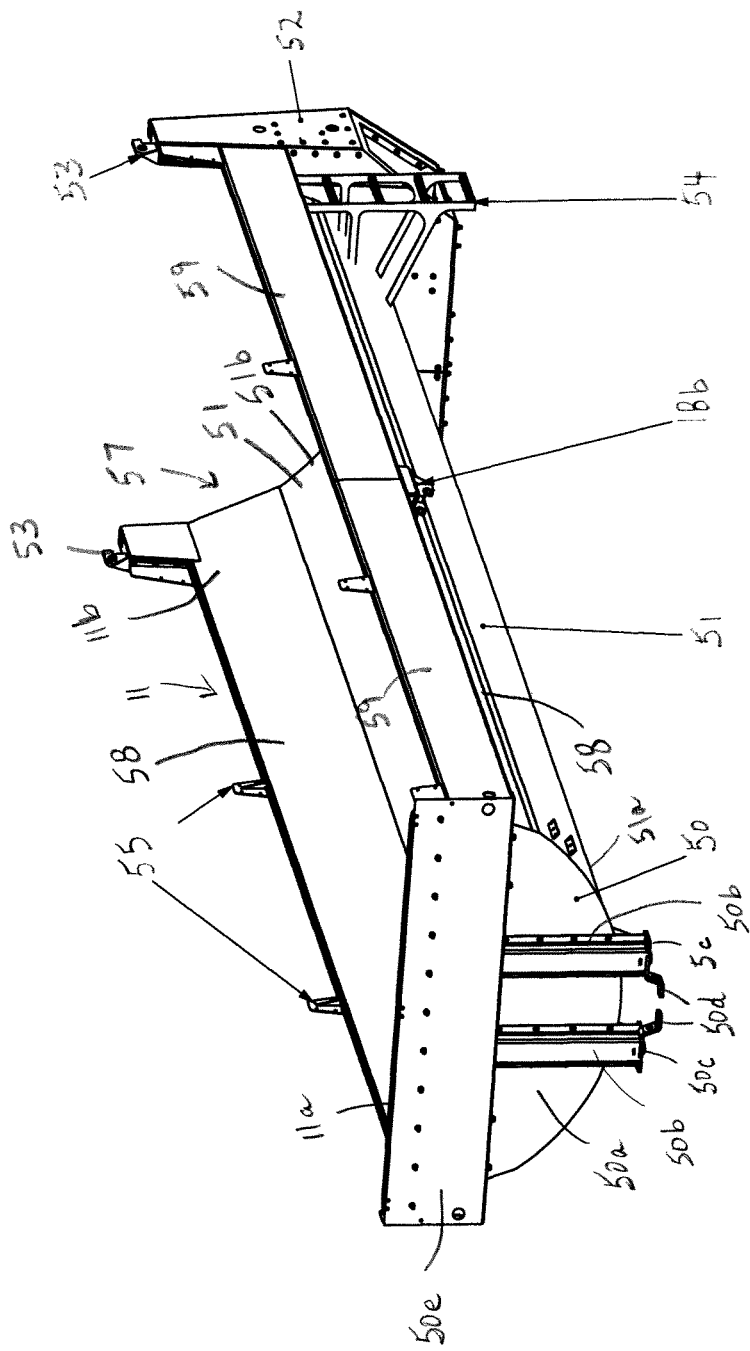
FIG. 16 is a perspective view of the dump body, showing the radiused (curved) floor panel, the body front panel assembly closing the front end of the dump body, and the body rear panel assembly at the rear end, with the dump gate removed.

FIG. 16 shows the dump body 11 comprised of a front body panel assembly 50, body section 57, and rear body panel assembly 52 to which the dump gate 13 mounts by fixed hinge mounts 53. An access ladder 54 is commonly attached, as are board brackets 55 which allow for extendible body height. Upper lift cylinder mounting assembly 18b form the upper mount point for the lift cylinders 17 to the upper rails 59, while lower lift cylinder mounting assembly 18a (FIG. 1) forms the lower mount point for the lift cylinders 17 to the side plates 21 of the frame assembly 12. The ratio of the body length to the body width, (where width is between the outermost surfaces of the upper rails 59), is generally 2.5:1 to 6:1, more typically 3.5:1 to 4.5:1 for on-road end dump trailers. As shown in FIG. 16 the curved body section 57 does not need inner or outer structural ribs along its length; the front and rear body panel assemblies 50, 52, together with the shaped upper rails 59, once connected together with the curved body section 57 provide sufficient structural stability for the typical loads of an end dump trailer. This leaves the inner and outer surfaces of the dump body 11 free from transverse joints, ribs, and fasteners, facilitating efficient and balanced discharge of the bulk material, reducing instability and the need for large tipping angles, and increasing wear life of the dump body surfaces.

The method and forming fixture for shaping the radiused body section 57 (with at least floor panel 51 in radiused shape), is described below with reference to FIGS. 17-29.

Figure 17:
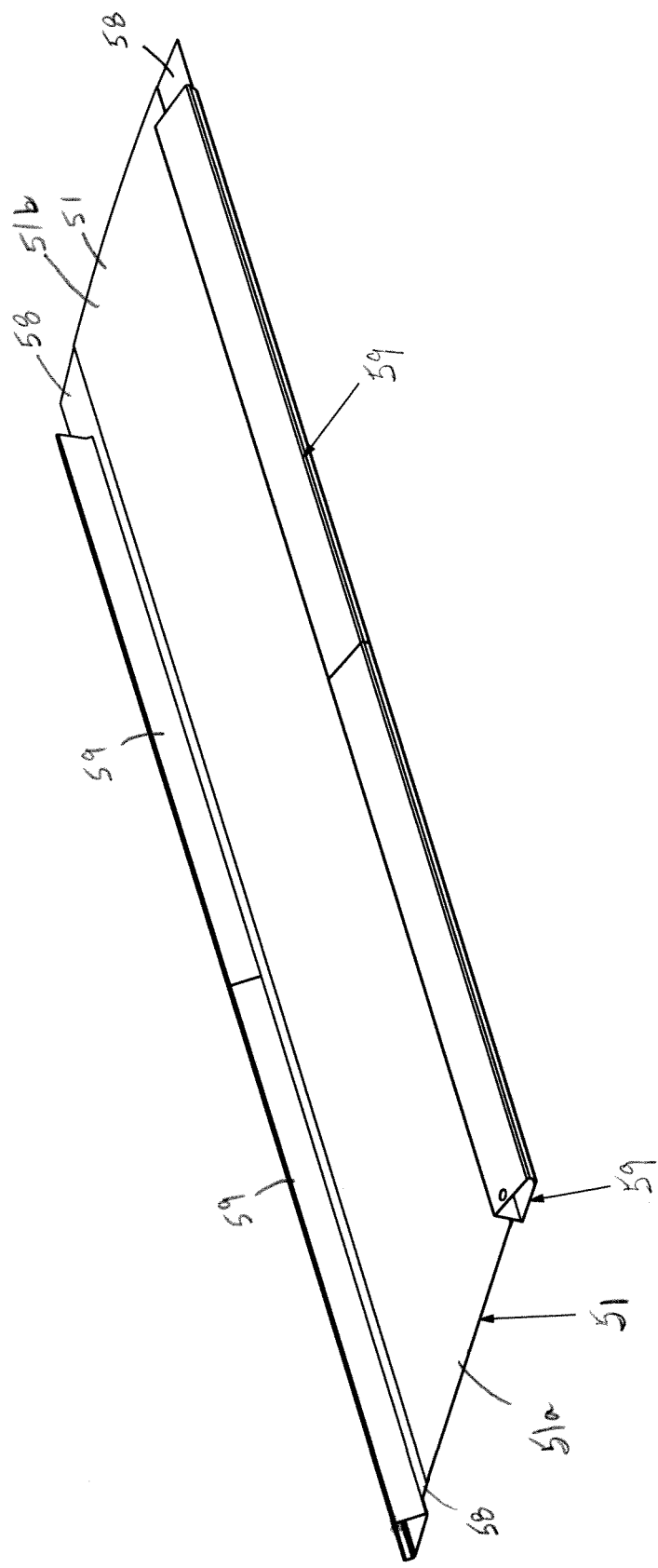
FIG. 17 is a perspective view of the seamless floor panel of the dump body of FIG. 16, with the side wall panel extensions and the upper rails connected, before bending to a curved radiused shape.

FIG. 17 shows the flat orientation that of connected body components, prior to bending to assume the shape of the curved body section 57. The body section 57 is comprised of a center floor panel 51, side wall extension panels 58 on either side of the floor panel 51, and upper rails 59 on either side of the extension panels 58. Depending on the size requirements for the dump body 11, and depending on availability of large metal sheets, the side wall extension panels 58 may not be needed, in which case, the upper rails 59 may be connected to the floor panel 51.

Figure 18:
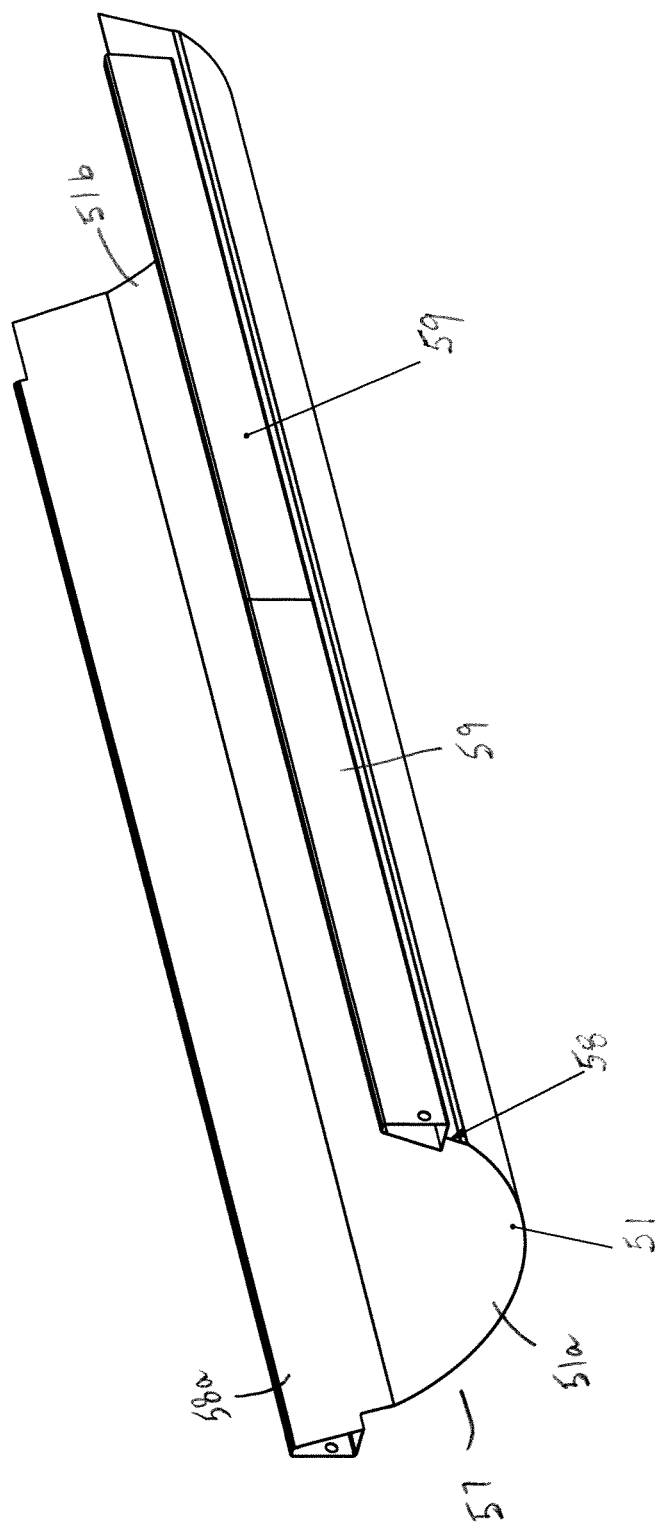
FIG. 18 is a schematic perspective view of the connected floor panel, side wall panels and upper rails showing the curved radius shape imparted to the floor panel.
Figure 19:
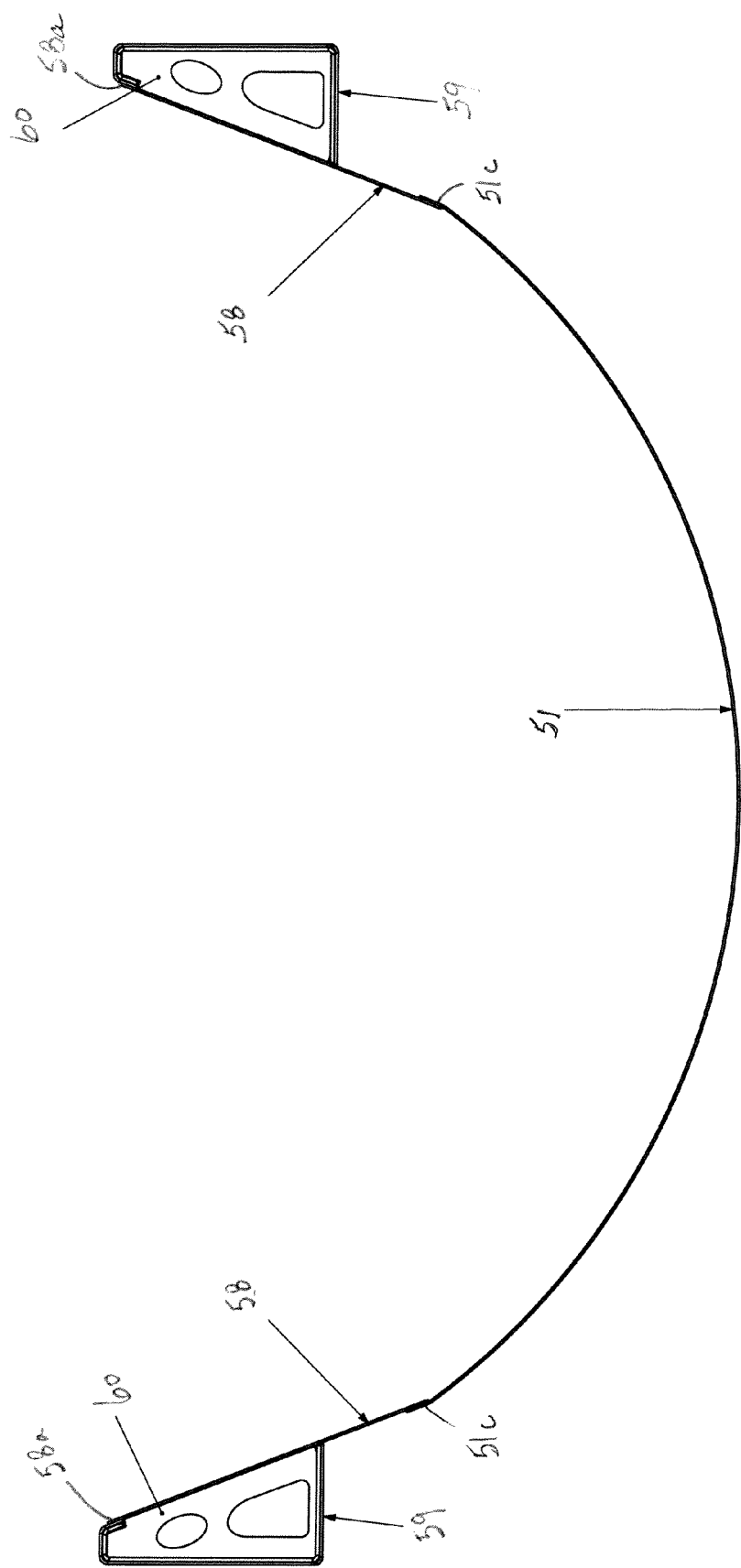
FIG. 19 is a schematic sectional view taken vertically through joints in the upper rail of FIG. 18, showing the generally triangular shape of the upper rails, and showing the rail stiffening members for reinforcing the upper point connection for the lift cylinders.

FIGS. 18, 19 show the center floor panel 51, preferably formed from a single, seamless sheet of steel, curved with a concave upwardly opening surface with a central axis parallel to the direction of road travel. This center floor panel 51 has no seams running transverse to the direction of material flow when dumping, allowing for easier flow of materials when dumping. The center floor panel 51 is connected to side wall extension panels 58 along the opposed side edges 51c of the floor panel 51. The side wall panels 58 are also formed from steel sheets, to extend the overall side wall height. Side wall extension panels 58 on each side of center floor panel 51 are connected to reinforcing upper rail members 59 along opposed free edges 58a (upper edges) of the side wall panels 58, and preferably also the outer and upper surfaces of the side wall panels (i.e., outward surface 58b as shown in FIG. 19). Welding is preferably used to connect the floor panel 51, side wall panels 58 and upper rails 59 at overlapping longitudinal seams. While threaded or rivet fasteners might be used, they are less desirable since they can interrupt the smooth inner surface of the dump body 11.

The upper rail members 59 are shown in a generally triangular shape in cross section (once connected to the side wall panels 58), as shown in FIG. 19. The upper rail members 59 may contain internal rail stiffeners 60 spaced as desirable to support point loading such as at attachment points for the upper lift cylinder mounting assembly 18b. In FIG. 19, the internal rail stiffeners 60 are generally triangular shaped, to provide the same shape as the upper rails 59. The upper rails 59 are shown in FIG. 18 as being joined at a generally central location along their length to accommodate the internal rail stiffeners 60. This joint at 60 may be moved, depending on the desired connecting point for the upper lift cylinder mounting assembly 18b (not shown in FIG. 18, and as more fully described below). The shape of upper rail members 59 can be modified, for example to be box shaped or other polygonal shape in cross section once connected to the side wall panels 58. The shape of the upper rails 59 assists in their purpose of structurally reinforcing the side wall extension panels 58 and receiving the upper lift cylinder mounting assembly 18b. The upper rails 59 may alternatively be formed by bending over the side edges 58a of the side wall panels 58. The side wall extensions 58 may be eliminated if sidewall height is reduced or if wider sections of center floor sheet 51 are used.

High strength steel, 2-10 mm thickness, such as 3-6 mm carbon steel with Brinell Hardness Index (BHN) of between 400 BHN and 500 BHN may be used for the center floor panel 51, providing increased wear life and superior flow during dumping due to the single panel, with no transverse seams. This grade of steel provides superior strength and low weight. Similar steel may be used in the side wall panels 58 and upper rails 59.

Figure 20:
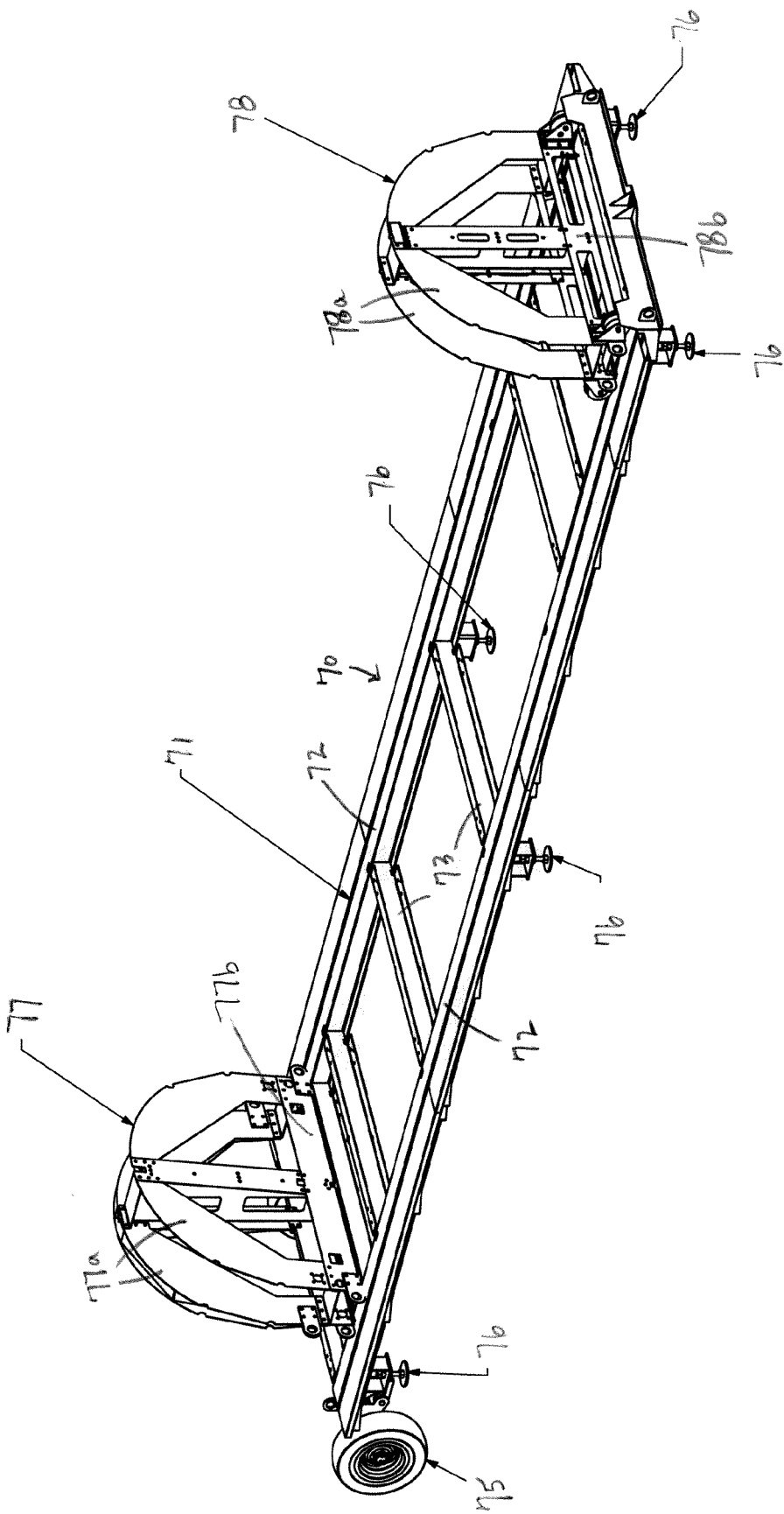
FIG. 20 is a perspective view of the curved mandrel frame fixture used to shape the radiused floor panel of FIG. 16, showing parallel spaced longitudinal rails, front end and rear end curved guide mandrels being moveable along the rails such that the curved guide mandrels are longitudinally spaced apart by an adjustable distance to accommodate the longitudinal length of the floor panel.
Figure 21:
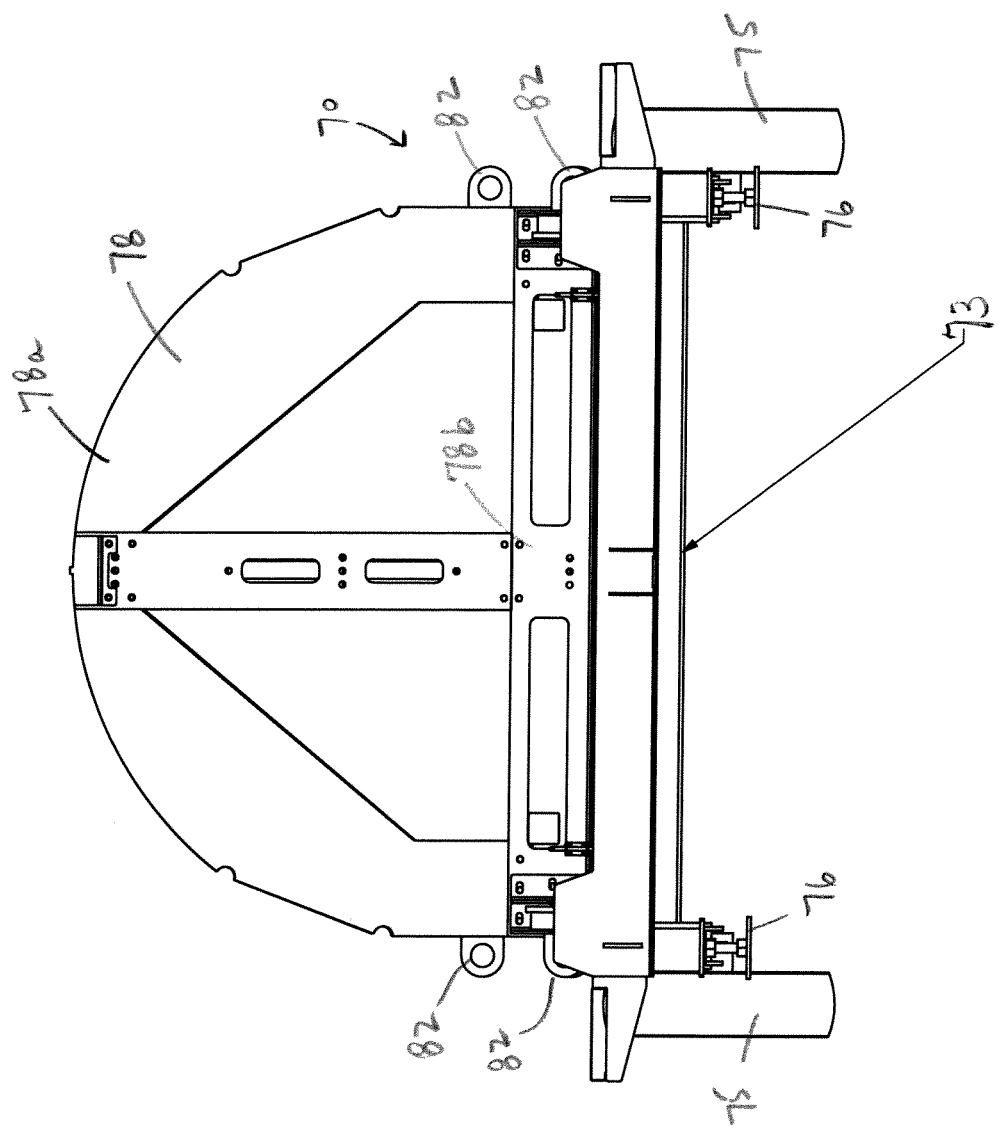
FIG. 21 is an end view of the curved mandrel frame fixture of FIG. 20 showing one of the front end or rear end curved guide mandrels.

FIGS. 20, 21 show the forming fixture 70 which is employed to aid in forming of the curved dump body section 57. The fixture 70 orients the dump body section 57 upside down compared to its final assembled orientation. FIG. 20 shows the fixture 70 comprised of a base assembly 71 with longitudinal, side rails 72, and cross members 73 to add structural integrity. Wheels 75 may be added to aid in towing the fixture 70 to and from the process location. Adjusting pads/legs 76 may be included to level the forming fixture 70 prior to use.

Figure 22:
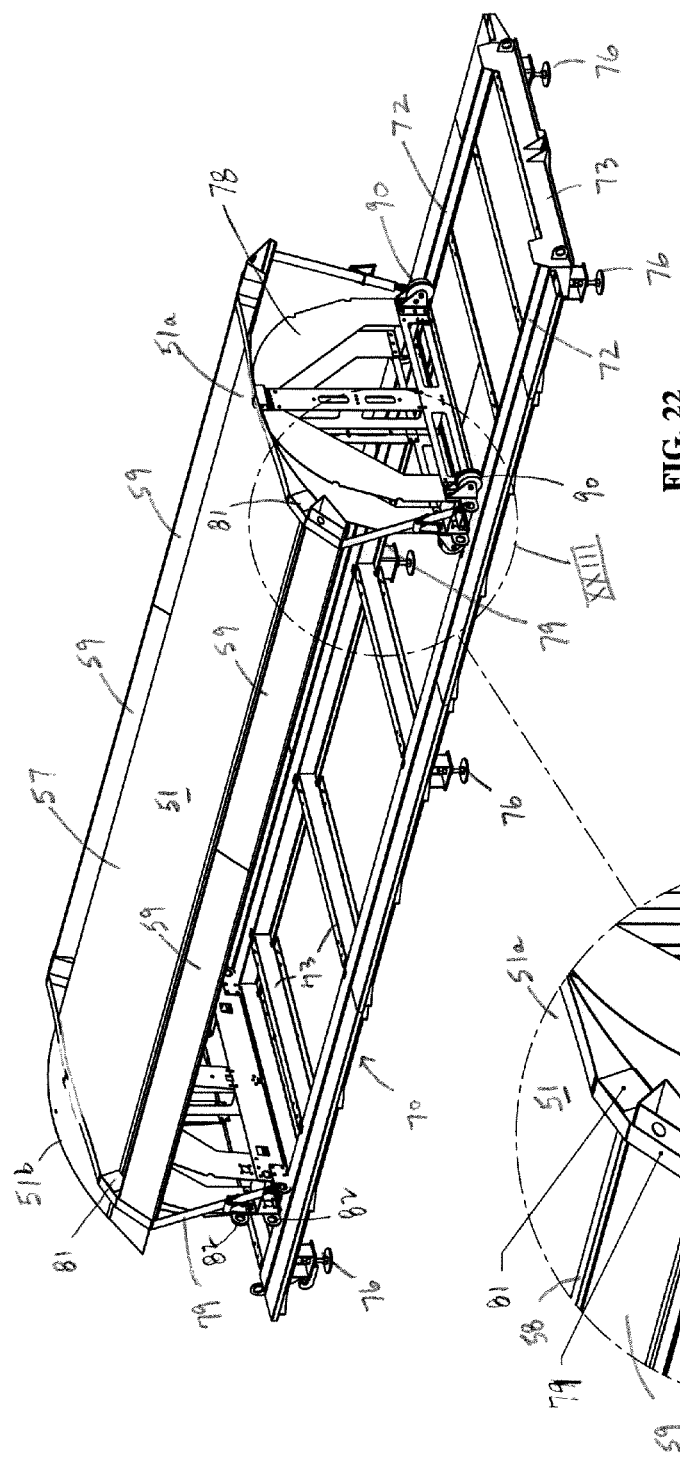
FIG. 22 is a perspective view of the curved mandrel frame fixture of FIG. 20, with the dump body of FIG. 17 laid over the curved guide mandrels.
Figure 23:
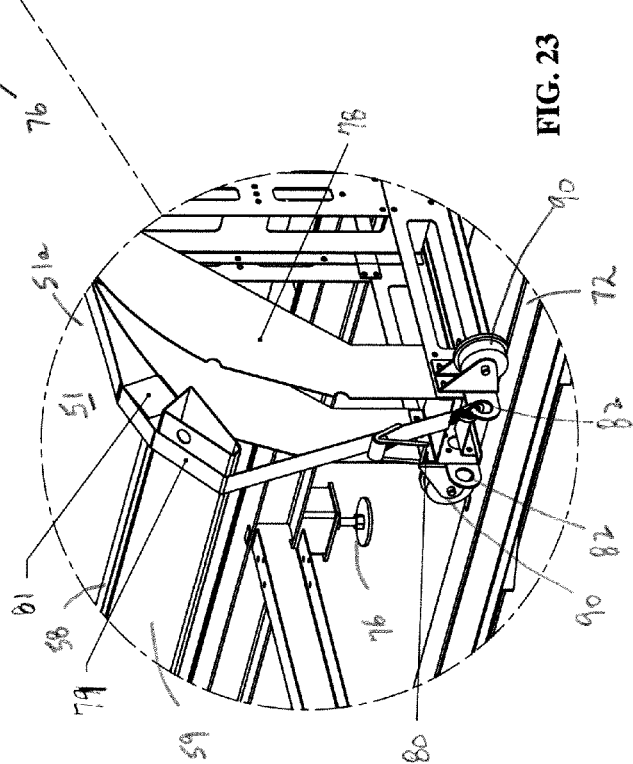
FIG. 23 is an enlarged perspective view of the detail from circle XXIII of FIG. 22, showing the tie down straps extending over the floor panel and fastened to the curved mandrel frame fixture to pull the floor panel against the curved guide mandrels for the radiused shape.
Figure 24:
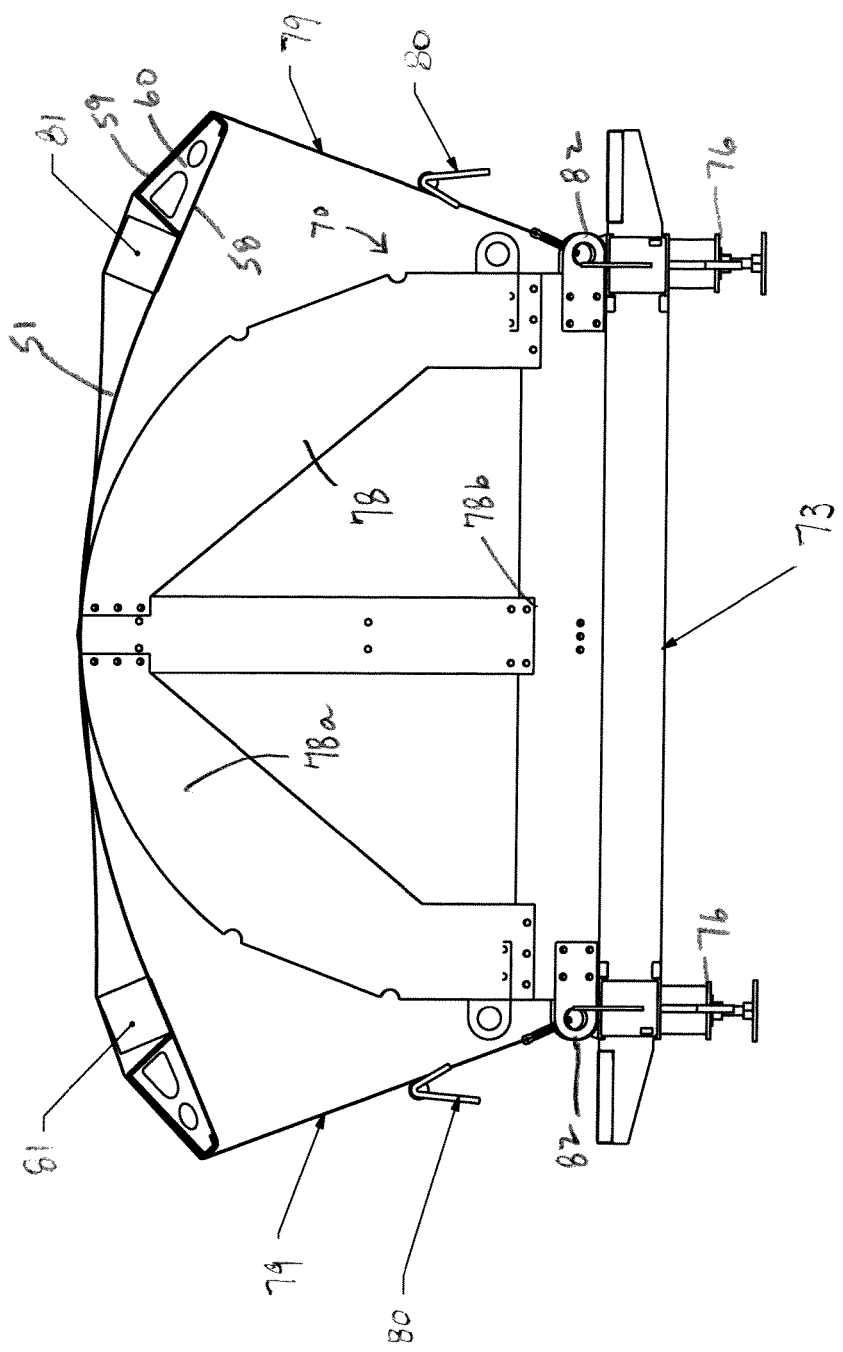
FIG. 24 is an end view of FIG. 22.

FIGS. 22-24 show the forming fixture 70 with the dump body section 57 of FIG. 17 (i.e., body floor panel 51 connected to side wall extensions 58 and upper rail members 59), draped over spaced apart, radiused (curved) front end and rear end guide mandrels 77, 78 located at each end of the fixture 70. The curved guide mandrels 77, 78 are substantially the same outer shape as the desired inner shape of the curved body section 57. In general it is desirable to form a floor panel 51 having a radius of curvature between about 30 and 72 inches, so the upper portion of the curved guide mandrels 77, 78 provide a convex radius of curvature in this range. The curved guide mandrels 77, 78 thus provide a curved mandrel frame component for bending the body section 57 without the need for rolling the steel of any of the body section 57 components. While the curved guide mandrels 77, 78 could be formed as a continuous mandrel frame, it is preferable to space them apart, and mount them on wheels 90 at the bases of guide mandrels 77, 78, to allow the guide mandrels 77, 78 to roll on the longitudinal rails 72. In this manner the guide mandrels 77, 78 can be longitudinally spaced apart by an adjustable distance to accommodate the longitudinal length of the floor panel 51, which will differ for different sizes of end dump trailers 10. The curved guide mandrels include spaced apart curved plates 77a, 78a, connected together and supported in a central section with an inverted T-frame 77b, 78b, which is structurally reinforced to withstand the weight of the dump body section 57. The wheels 90 are connected at the outer extremities of the T-frames 77b, 78b to roll on the side rails 72.

When placed over the fixture 70, the weight of the body section 57 causes the body section 57 to flex downward at its outer edges. FIGS. 22-23 show the body section 57 resting on the fixture 70 with the flexure due to gravitational forces depicted (the amount of downward flexure is a function of the weight of the body section 57, the material used, and the thickness of the material used). Additional clamping force is applied to pull the body section 57 around the guide mandrels 77, 78. Tie down straps 79 with cinch tightening mechanisms 80 are wrapped over and around the outside of the body floor section 57 and attached at the lower ends to latching points 82 affixed at the outer extremities of the base of the T-frames 77b, 78b of the guide mandrels 77, 78. Spacer blocks 81 are included adjacent the upper rail 59 to apply inward pressure to help the side wall panels 58 conform to the guide mandrels 77, 78. Tightening mechanisms 80 can be any tensioning devices, for example ratchet, winch cables, chain tighteners, steel straps etc. Tightening, or cinching, of the straps 79 applies downward and inward force to cause the body section 57 to conform to the shape of the mandrels 77, 78.

Figure 25:
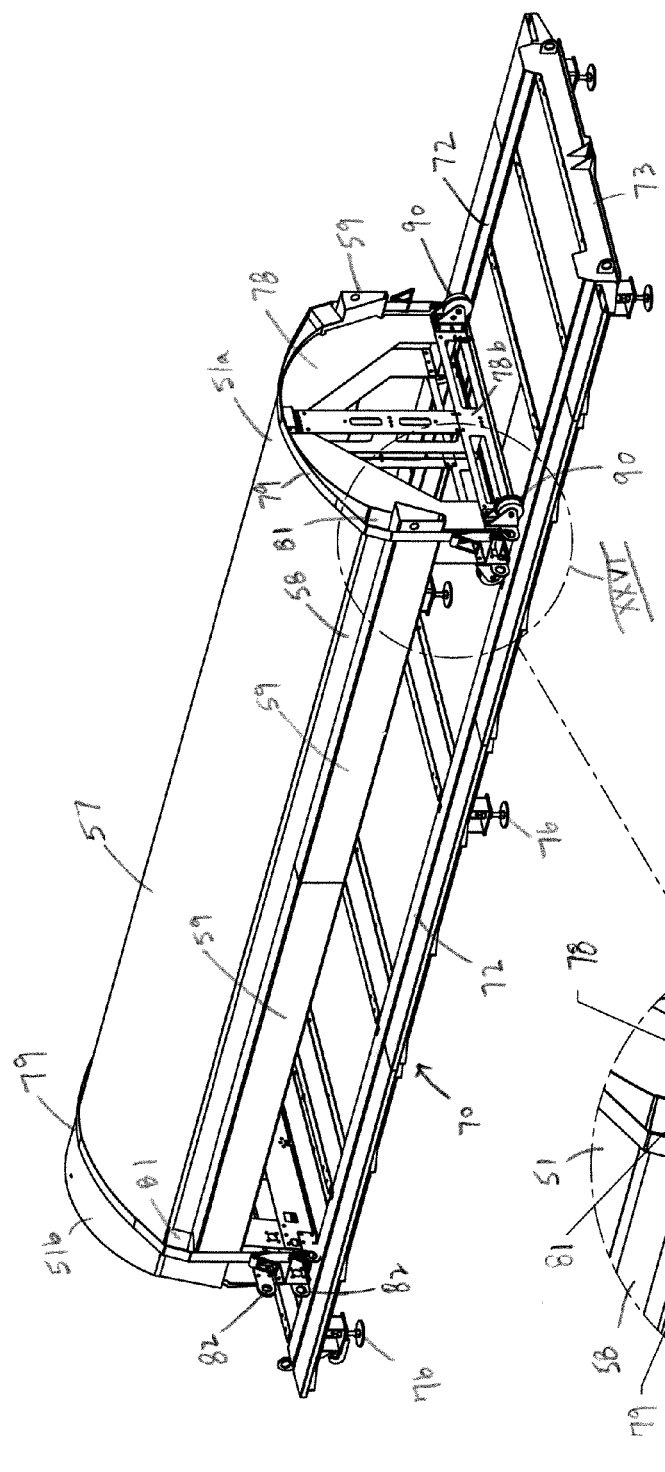
FIG. 25 is a perspective view of the curved mandrel frame fixture of FIG. 22, but showing the tie down straps bending the dump body and secured to the front end and rear end curved guide mandrels.
Figure 26:
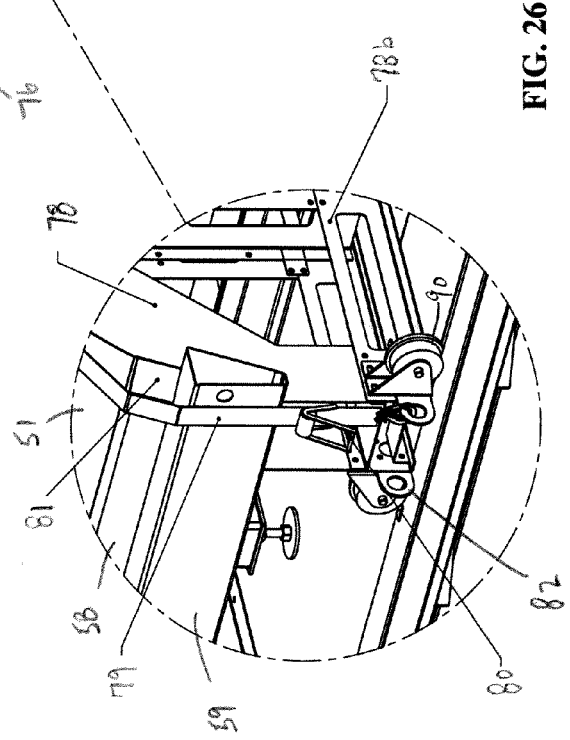
FIG. 26 is an enlarged perspective view of the detail from circle XXVI of FIG. 25.
Figure 27:
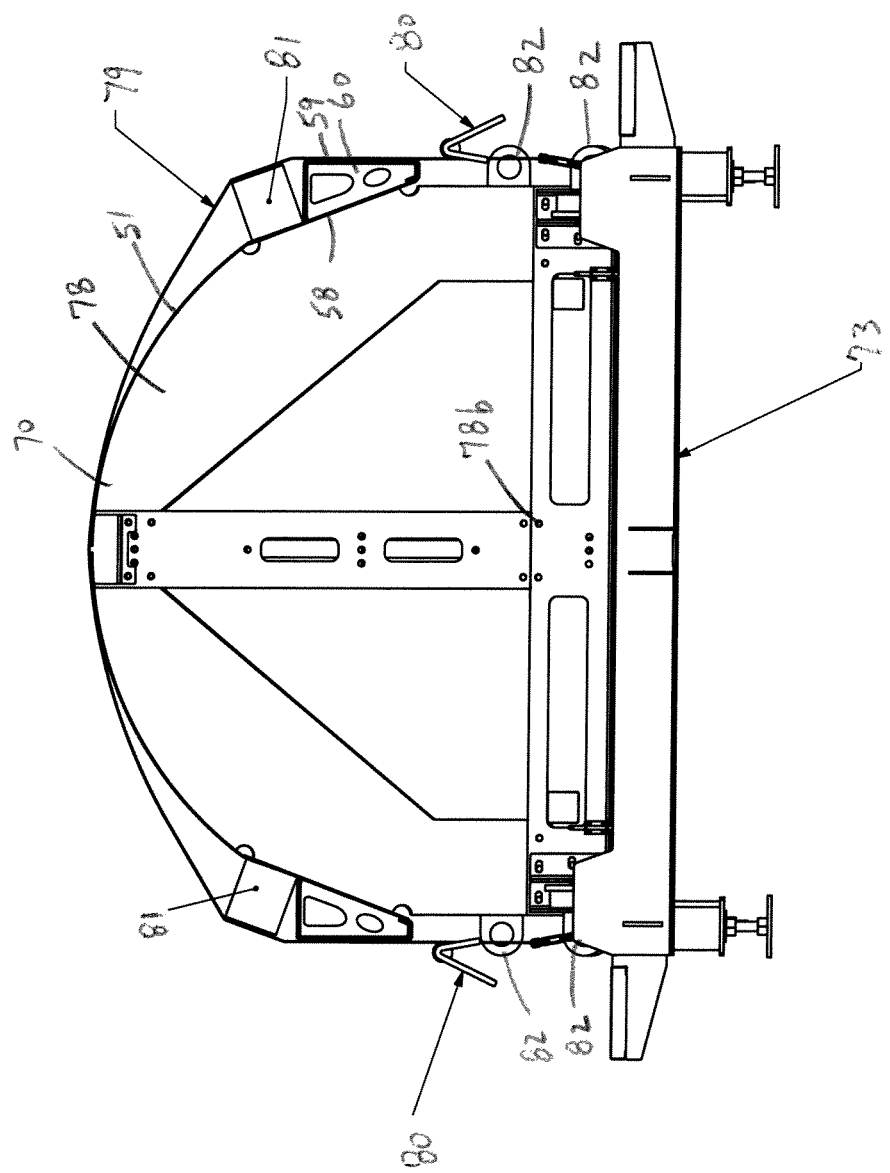
FIG. 27 is an end view of FIG. 25.

FIGS. 25-27 show the curved body section 57 pulled entirely down around the guide mandrels 77, 78 by virtue of the clamping force provided by the straps 79. Front body panel assembly 50 and rear body panel assembly 52 are then positioned (not yet connected in Figures) and welded to the front and rear ends 51a, 51b of the center floor panel section 51 and to the coextensive front end and rear ends of the side wall panels 58 and to the upper rails 59. The upper rail 59 is shown spaced from rear end 51b (see FIG. 17) to accommodate overlap of the rear body panel assembly 52 on the outside surface of the dump body 11. Once the welding is completed, the straps 79 can be removed and the body section 57 retains the radiused shape with the strength of the upper rail members 59 overcoming the tendency of the center floor section 51 to flex back toward its original flat shape. Bolting, riveting, or other forms of mechanical fastening may be used to eliminate or partially eliminate welding operations. Under typical conditions (grade and thickness of floor section materials) the floor section 51 is not permanently deformed into the radiused shape, but instead held in this shape by the combined strength of the end assemblies 50, 52 and the upper rail members 59. Some flexure back toward the flat shape occurs but is acceptable for the purpose of the dump body 11. Alternate means of applying external force to the floor section could be employed instead of tie down straps 79, such as, but not limited to, pneumatic or hydraulic clamping with or without an inner convex-shaped curved mandrel.

The front body panel assembly 50 as shown in FIG. 16, includes a front wall 50a closing the front end of the dump body 11, spaced apart vertical structural support beams 50b connected to the front facing wall of the front wall 50a, cushions 50c at the base of the vertical structural support beams 50b for landing the dump body on the kingpin assembly 19, and angled guide brackets 50d connected at the base of the vertical structural support beams 50b to centre the dump body 11 within the kingpin assembly 19. The front wall 50a is welded to the front end 11a of the dump body as a T-joint weld, with the front wall 50a extending by a small distance, such as one half inch, outwardly from the front end 11a of the dump body 11. This allows for welding along both the inside and outside of the T-joint formed between the front wall 50a and the front end of the dump body 11. An upper plate 50e is connected at the front faces of the vertical structural support beams 50b and is connected, for example by welding, at its side edges to the upper rails 59 so as to close the upper rails 59 and assist in holding the curved shape of the dump body floor panel 51. The upper plate 50e may support a tarp shelf (not shown) as is conventional for end dump trailers.

FIGS. 28, 29 show the structure of bolted (threaded or rivet fasteners) and welded rear body panel assembly 52. The rear body panel assembly forms an upwardly opening curved profile P to accommodate the curved body section 57 of the dump body 11. Rear body panel assembly 52 includes left and right front facing panels 91a, 91b and left and right rear facing panels 92a, 92b interconnected with bolts in a spaced relationship with left and right side panels 94a, 94b and bottom panels 95, 96. A joining panel 97 may be used between left and right rear panels 92a, 92b. Bolting together of the panels 91-97 may be facilitated by forming right angle flanges 98 at one or more of the edges of one or more of the panels 91-97. One or more splice plates 99 may be used for bolting together any panel joints which abut without flanges, as shown for the central joints between joining panel 97 and left and right rear panels 92a, 92b, between left and right front panels 91a, 91b, and between bottom panels 95, 96. The rear body panel assembly 52 is welded to the outside surface of the body section 57 of the dump body, such that rear end 11b extends a small distance to form a protruding lip (not visible in figures), for example one half inch, beyond the rear of the rear body panel assembly 52. When the dump body 11 is closed by the dump gate 13, the dump gate 13 rests against this protruding lip of the dump body 11.

In its assembled state, rear body panel assembly 52 provides structural stability to the center floor panel 51 of the dump body 11 as the upwardly facing edges of the panels 91-97 are welded or otherwise attached to the curved dump body section 57, as described above. Once attached, the rear body panel assembly 52 also provides hollow side housings 100 between the dump body 11 and the panels 90-97 at the rear of the dump body 11 for housing parts of the latch lift assembly 15, as described below. This prevents the latch linkage assembly 15 components from coming into contact with the bulk material payload and/or the environment. Latch lift actuator mounting bracket 101 is bolted into rear body panel assembly 52. In FIGS. 28-32 the bracket 101 is bolted to the side panels 94a, 94b.

In the preferred forming process, rear body panel assembly 52 is assembled using a hybrid combination of mechanical fastening (threaded or rivet fasteners) and welding. For example, lock bolts 102 and lock collars 103 (FIG. 29) may be used in combination with electric resistance welding where desired for additional strength. Bolt holes may be formed in the panels 91-97 for example by drilling or laser cutting. Assembly may proceed with other types of mechanical fasteners such as helical thread bolts and nuts or panels 91-97 may be joined solely with welding.

In an alternate embodiment, the connected floor panel 51, side wall panel extensions 58 and upper rails 59 may be clamped into a radiused shape of FIG. 18 using the front and rear body panel assemblies 50, 52 as curved mandrels, and the dump body 11 may then be connected, for example by welding or with threaded or rivet fasteners, to the front and rear body panel assemblies 50, 52.

Dual Lift Cylinder Assembly

FIGS. 1-5 show a dual lift cylinder (hoist) assembly 14, including a lift actuator such as a hydraulic cylinder 17 mounted on each side of the dump body 11 between the lower and upper lift cylinder mounting assemblies 18a, 18b for pivotal movement. The lift cylinders 17 have a sufficient length, and are mounted, so that extension of the cylinders 17 rotates and rearwardly tips the dump body 11 through rear, body tipping hinge assembly 27 between a lowered position (FIGS. 1, 2) for loading and transporting bulk material and a raised position (FIG. 3), at an angle of at least 40 degrees from horizontal, more preferably 45 degrees, for dumping bulk material from the open rear end 11b of the dump body 11.

For connecting each of the lift cylinders 17 at a lower end 17a, the frame assembly 12 may include parallel spaced, downwardly extending side plate extensions 20, each connected to the lower portion 21b, at an outer surface, of each of the side plates 21. Each of the lower lift cylinder mounting assemblies 18a includes a plate 18 fixed to the side plate extension 20, such as with threaded or rivet fasteners, at a point between the front and rear portions 12a, 12b of the frame assembly 12. A mounting bracket 46 extends outwardly from the plate 18. A spherical bearing 47 is provided at the lower end 17a of the lift cylinder 17 to provide a pivotal mount to mounting assembly 18a. Cylinder mounting pin 48 extends generally perpendicularly through the spherical bearing 47, and is formed with drilled holes (not visible in figures). The drilled holes are oriented generally perpendicularly to the long axis of the mounting pin 48. Bolts 49 extend through the mounting pin holes to connect the mounting pin 48 at its ends to the mounting bracket 46 in a trunnion fashion.

For connecting each of the lift cylinders 17 at an upper end 17b, the upper lift cylinder mounting assembly 18b is fixed to the bottom edge of the upper rail 59 of the dump body 11 at a point rearwardly of the lower lift cylinder mounting assembly 18a. This point of connection to the upper rail 59 is generally proximate the midpoint of the length of the dump body 11 or within the center three quarters of the length of the dump body 11, such as within the centre one half portion of the length. The upper lift cylinder mounting assembly 18b is also located to be proximate a vertical stiffener 60 within the upper rail to provide structural stability to the upper pivotal mount. The upper end 17b of the lift cylinder 17 includes a spherical bearing 47b to provide a pivotal mount to the upper lift cylinder mounting assembly 18b. The mounting assembly 18b includes a downwardly extending mounting bracket 46b. A cylinder mounting pin 48b extends generally perpendicularly through the spherical bearing 47b, and includes drilled holes (not visible in the figures). The drilled holes are oriented generally perpendicularly to the long axis of the mounting pin 48b. Bolts 49b extend through the pin holes to connect the mounting pin 48b at its ends to the mounting bracket 46b in a trunnion fashion.

This nature of the pivotal mount at each of the cylinder ends 17a, 17b allow pivotal movement of the lift cylinders 17 in at least two planes, such that the lift cylinders 17 may be angled and extended generally rearwardly, upwardly and outwardly from the lower ends 17a to the upper ends 17b.

A structural cross member 56 extends between the side plates extensions 20 to provide strength between the lower pivotal mounting of the lift cylinders 17. The side plate extensions 20 and cross member 56 are formed so as to allow road clearance, such as about 12 inches above ground. In the Figures, the side plate extensions 20 are located just rearwardly of the height adjustable landing gear legs 45.

The hydraulic lift cylinders 17 may be telescoping and in one or more stages (for example one, two or three telescoping stages, depending on size and applications for end dump trailer 10). As shown above, the lower ends 17a of the cylinders 17, by being connected to the frame assembly 12 are spaced more closely together than are the upper ends 17b, which are connected to the upper rails 59. The cylinders 17 thus are angled rearwardly, upwardly and outwardly from their lower ends 17a to their upper ends 17b. During extension, the cylinders 17 rotate rearwardly, upwardly and inwardly in at least two planes. However, in alternate embodiments, the lower and upper ends 17a, 17b of hydraulic cylinders 17 may be equally spaced apart from each other so as to cause the cylinders 17 to rotate in parallel planes during extension.

The hydraulic cylinders 17 are extended to raise dump body 11 into a dumping position by the application of hydraulic pressure to the underside of the pistons (not visible), and allowing hydraulic fluid in the upper volume of the cylinders 17 to return to the fluid reservoir (not visible). Lowering of dump body 11 to a horizontal transport position is ensured to be timely by a combination of gravitational forces and cylinder retracting force accomplished by application of hydraulic pressure on the upper surface area of the hydraulic cylinder pistons while allowing hydraulic fluid in the lower volume of the cylinders to return to the fluid reservoir. The double-acting (dual) nature of the cylinders 17 ensures that the dump body is lowered based on the hydraulic flow and pressure characteristics of the hydraulic system, not relying solely on gravitational forces to overcome hydraulic fluid flow resistance.

Advantageous features of the dual acting lift cylinder assembly 14 will be apparent. Short tipping cycles may be obtained due to double acting nature of cylinders 17. Mounting the cylinders 17 in a rearwardly inclined manner, between the downwardly extending side plate extensions 20 (i.e., below lower portions 21b of side plates 21) and to the upper rails 59 allows for shortening of the full extension length needed for of the cylinders 17 (compared to extension lengths for prior art front mounted vertical hoists, or hoists to bottom or sides of dump bodies). This in turn allows the use of one, two or three stage telescoping cylinders, much less that five stage hoist cylinders of the prior art.

Latch Lift Assemblies

Figure 31:
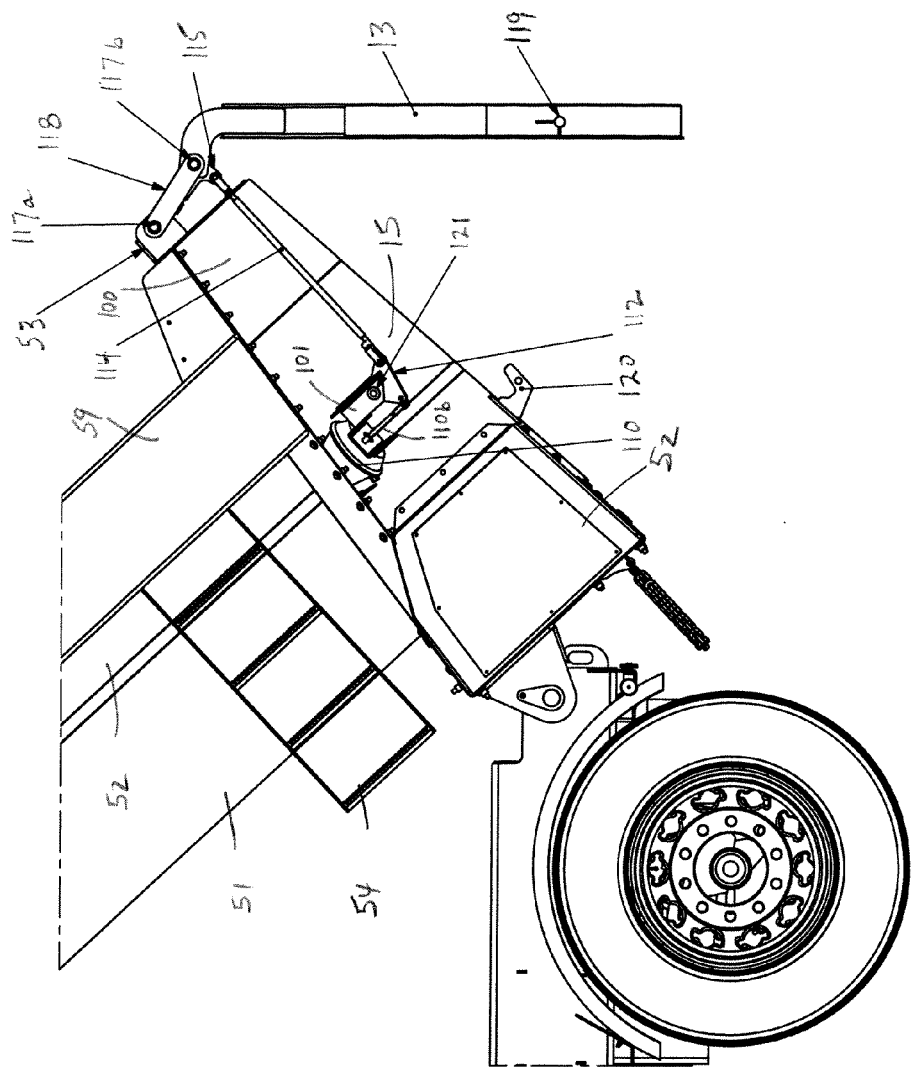
FIG. 31 is a partial, side view of the dump body with the body rear panel assembly partially removed to show the latch lift assembly having vertically raised the dump gate from its latched position, and with the dump gate in the open position as the dump body is raised with the dual lift cylinders.
Figure 30:
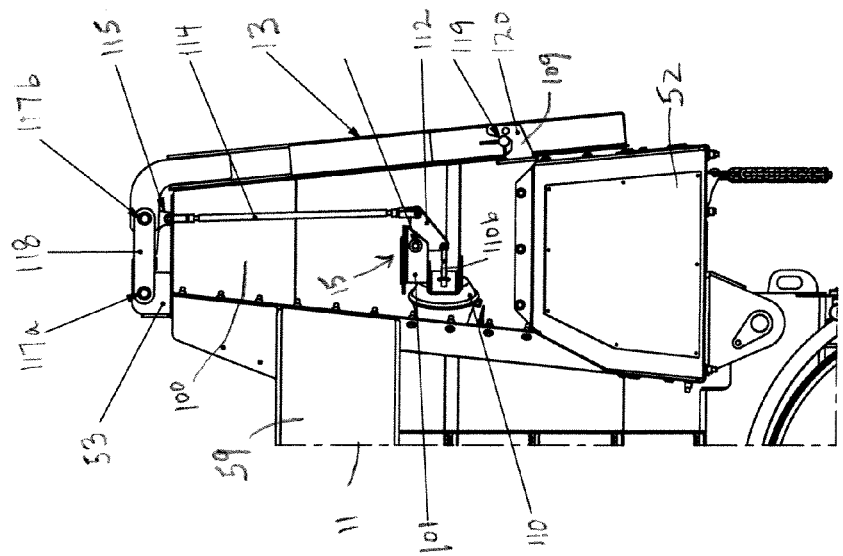
FIG. 30 is a partial, side view of the dump body hinged at its rear end, with the body rear panel assembly partially removed to show one of the latch lift assemblies, and to show the dump gate in the closed, latched position.
Figure 32:
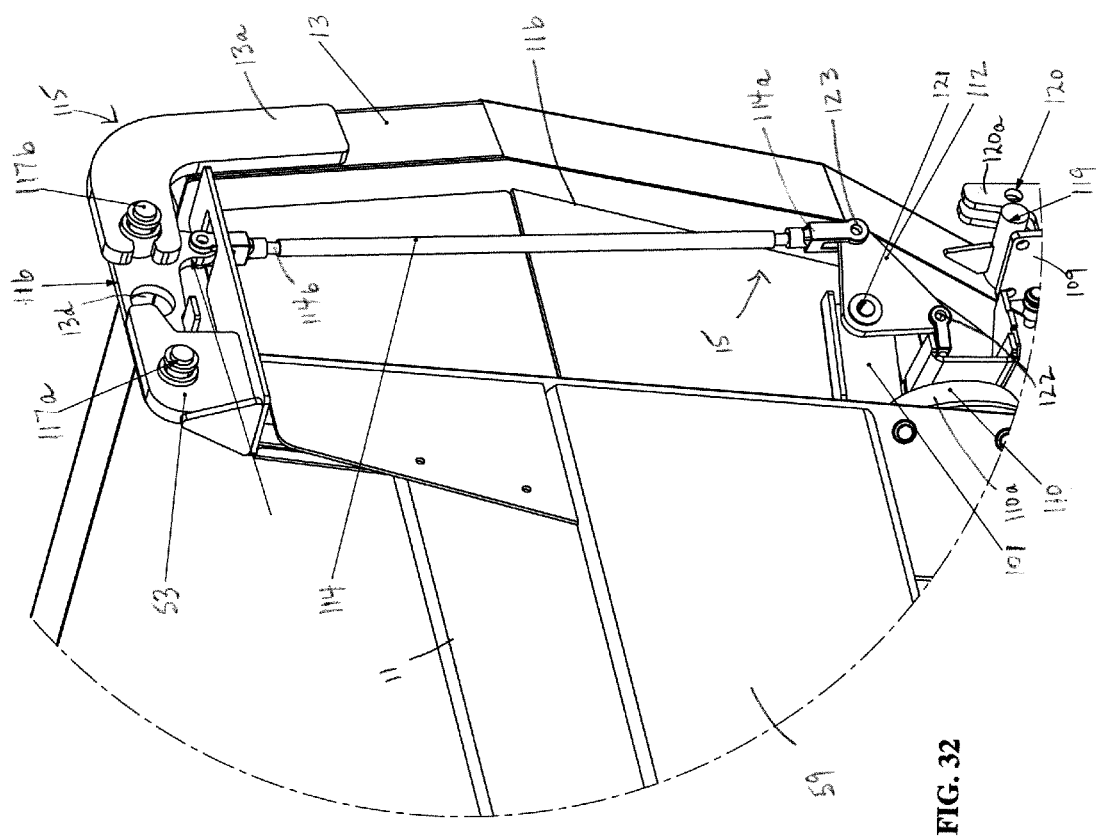
FIG. 32 is a partial, perspective view of the dump body with the body rear panel assembly partially removed, and with some parts of the latch lift assembly removed, to show details of the latch lift assembly and the horizontal gate hinge assembly with the dump gate in the closed position and the dump body in the lowered position.

FIGS. 30-32 show a cut-away view of the rear body panel assembly 52 with FIGS. 30, 32 showing the dump gate 13 latched in the closed and locked position and FIG. 31 showing the dump gate 13 unlatched in the open position. In FIGS. 30-32 the left side panel 94a is cut away from the rear body panel assembly 52 revealing the inside of hollow side housing 100 which contains a latch lift assembly 15 on the side of dump body 11. An identical, but mirror image latch lift assembly 15 is provided on the other side of the dump body 11.

Figure 33:
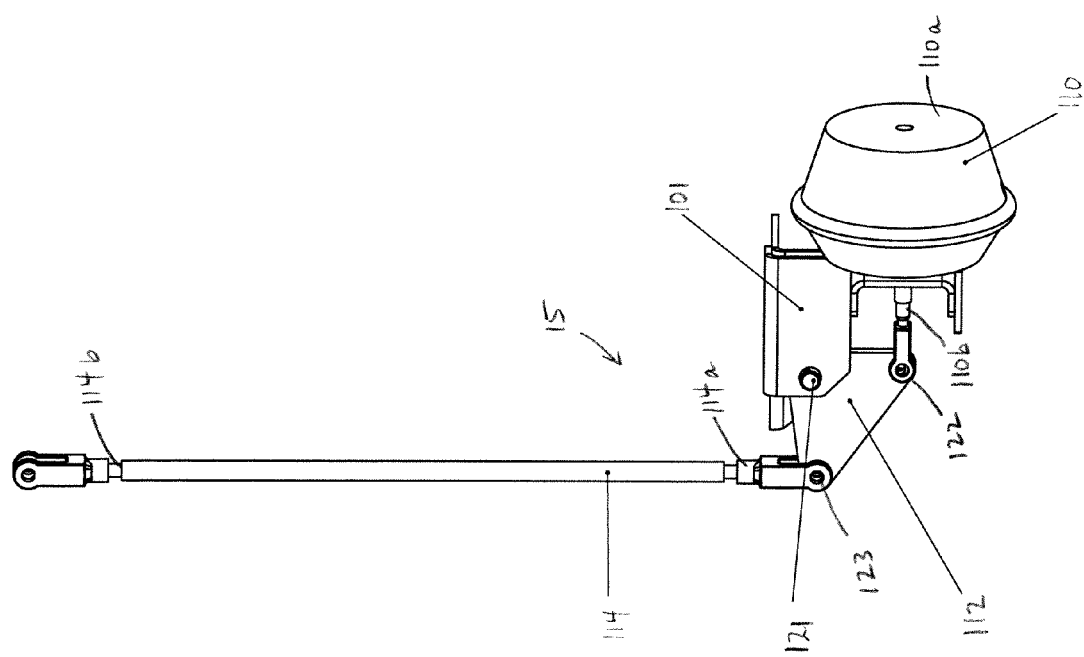
FIG. 33 is a perspective view of some of the latch lift assembly components separated from the dump body.
Figure 34:
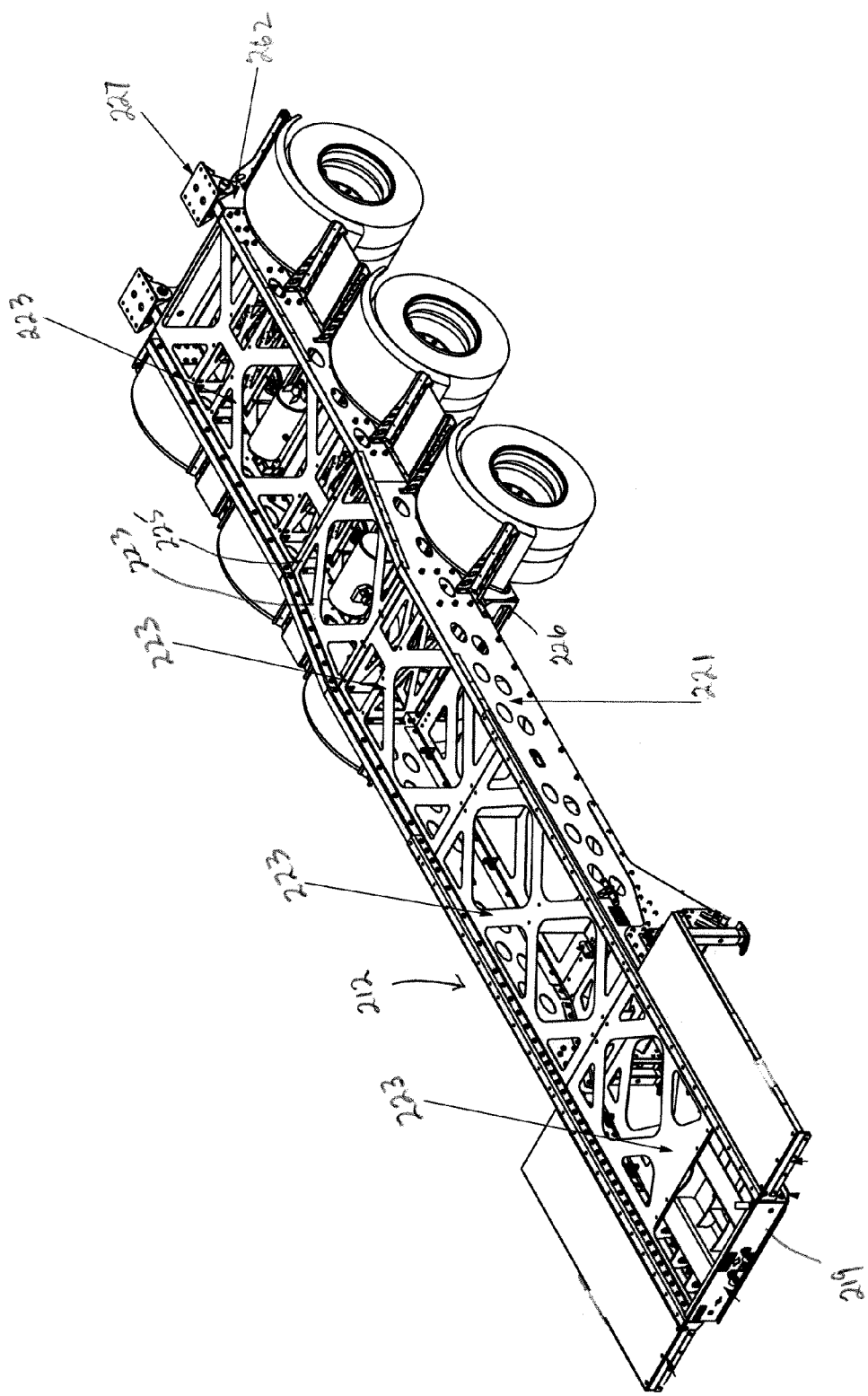
FIG. 34 is a perspective view of a three axle, wheeled trailer frame assembly with the dump body and dual acting lift cylinders removed, showing the body tipping horizontal hinge assembly for the dump body at the rear end, and showing the rear portion of the frame assembly incorporating the rear, triple axle suspension assembly within the side plates of the frame assembly.
Figure 35:
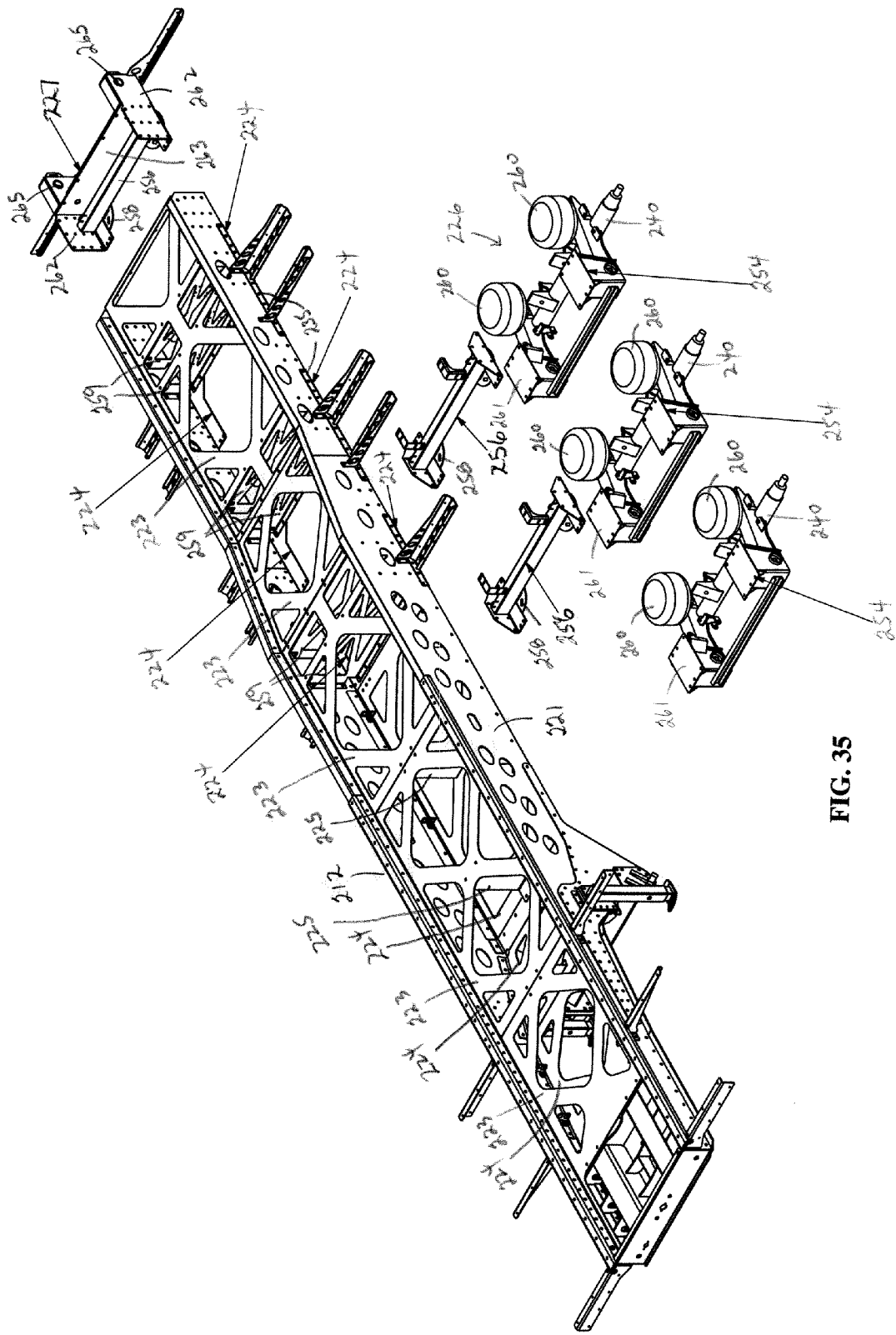
FIG. 35 is a perspective view of the frame assembly of FIG. 34, with the wheels and front fenders removed, and the rear suspension and horizontal hinge assembly components in exploded view ready to mount to the frame assembly.
Figure 36:
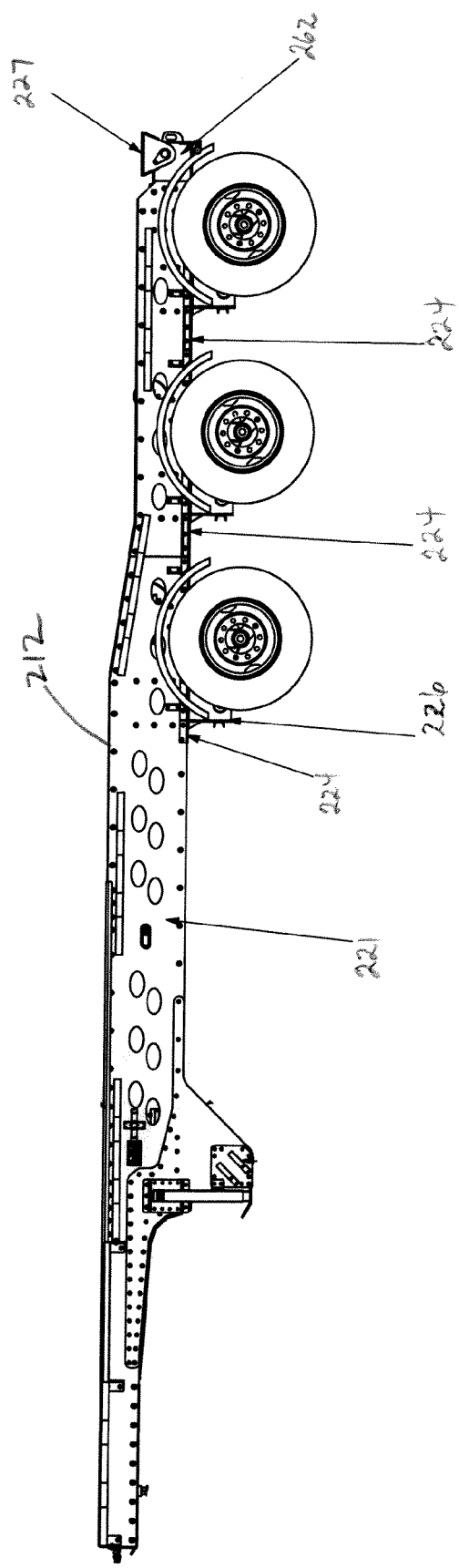
FIG. 36 is a side view of the frame assembly of FIG. 34.
Figure 37:
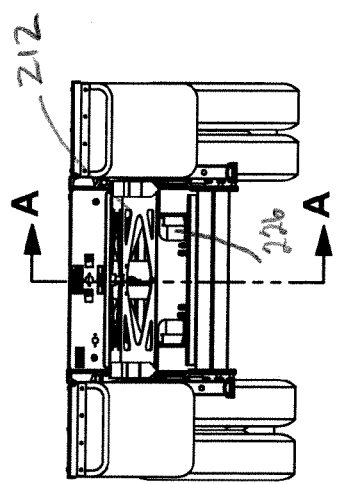
FIG. 37 is an end view of the frame assembly of FIG. 34.
Figure 38:
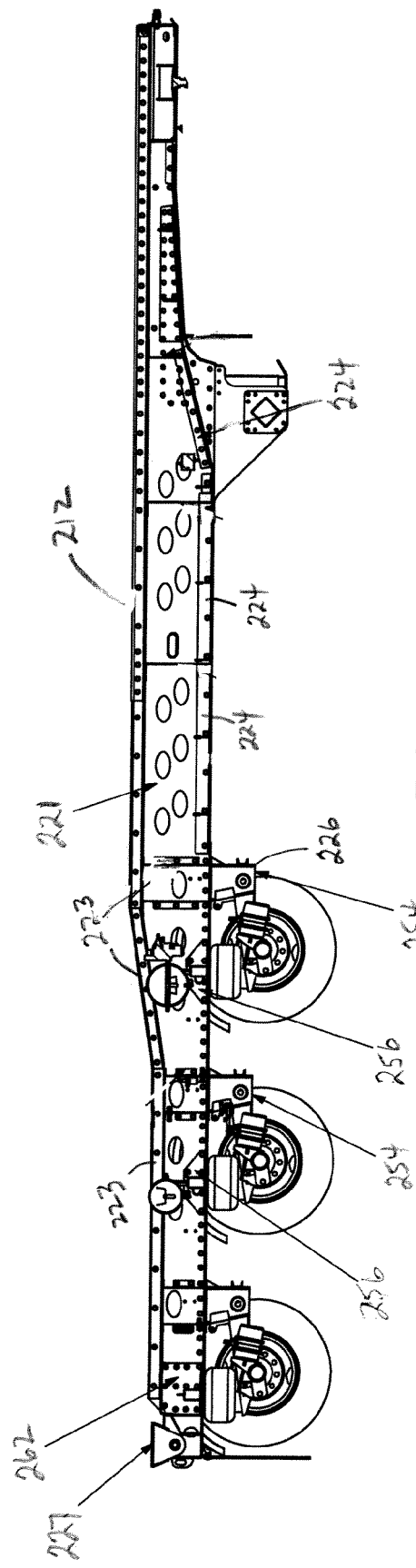
FIG. 38 is a sectional view taken along line D-D of FIG. 37.

The details of the latch lift assembly are best shown in FIG. 32. FIG. 33 shows some components of the latch lift assembly 15, separate from the rear body panel assembly 52, as connected to latch lift actuator mounting bracket 101 from the rear body panel assembly 52. The mounting bracket 101 connection within the rear body panel assembly 52 is best shown in FIG. 28. Latch lift assemblies 15 are operative to vertically lift the dump gate 13 before, during and/or after the dump body 11 is raised or lowered in order to release or re-engage a pin and cradle catch latch assemblies 109 on opposite sides of the dump gate 13.

The latch lift actuator mounting bracket 101 is shown in these FIGS. 30-33 as though suspended, though it is actually bolted to the cut away left side panel 94a. A linear actuator 110 is adapted for rigid connection to and movement with the dump body 11, preferably through the mounting bracket 101 of the rear body panel assembly 52. The linear actuator 110 may be air actuated, or alternatively hydraulic or electric powered actuators may be used. As shown in the embodiment of the Figures, the cylinder portion 110a of air actuator 110 is rigidly connected to a lower portion of mounting bracket 101. As shown in FIGS. 32, lift link plate 112 provides triangularly arranged first, second and third pivot points 121, 122 and 123 so as to provide a first pivot connection at 121 to the mounting bracket 101 (and thus to the rear body panel assembly 52 and the dump body 11), a second pivot connection at 122 to the end of piston 110b of the actuator 110, and a third pivot connection at 123 to the lower end 114a of a tie rod 114. The tie rod 114 extends generally vertically upwardly with its upper end 114b being pivotally connected to the gate hinge assembly 115.

As best shown in FIG. 32, the gate hinge assembly 115 includes a dump gate lift link arm 116, through which horizontal gate bar 13c extends. The gate bar 13c is shown in FIG. 1, while the hole 13d in dump gate lift link arm 116, through which horizontal gate bar 13c extends is shown without the gate bar 13c in FIG. 32. The dump gate lift link arm 116 has triangularly positioned pivot point connections to the tie rod 114, the upper portion 13a of the dump gate 13 and the fixed hinge 53 of the dump body 11. The dump gate lift link arm 116 is rotatably connected at one end through front pin 117a to fixed horizontal hinge 53 on dump body 11 and at an opposed end to dump gate 13 through rear pin 117b. A lower end of the gate lift link arm 116 is rotatably connected to the upper end 114b of the tie rod 114 through lower pin 117c. Thus latch lift assembly 15 operates such that upward rotation of lift link plate 112 (caused by extension of piston 110b) imparts a vertical upward movement to the dump gate 13. A reinforcement plate 118 may be provided between front and rear pins 117a, 117b to aid in favorable double-shear loading of the pins 117a, 117b. This reinforcement plate 118 is removed in FIG. 32 to better show the dump gate link arm 116.

In FIG. 32, each of the pin and cradle latch assemblies 109 (one on each side of the dump body 11) includes a latch pin 119 connected to the dump gate 13 via welding or other suitable means and an upwardly opening cradle catch 120 welded to the body rear panel assembly 52. The cradle catch 120 includes an inclined ramp 120a extending upwardly and rearwardly, which the latch pin 119 must clear to be unlatched (as by the upward vertical movement by the latch lift assembly 15). This inclined ramp 120a feature results in the dump gate 13 being forcibly pressed against the rear end 11b of the dump body 11 when latched to effectively seal the dump gate 13 to the dump body 11. This is particularly important during transport of bulk materials, when the dump gate is in the closed, latched condition. When the dump gate 13 is raised, latch pin 119 is freed from latching engagement with the cradle catch 120. Latch pin 119 preferably extends horizontally outwardly from either side of the dump gate 13 at a location on the lower portion 13b of the dump gate 13, that is, below a horizontal center line of the dump gate 13.

In one alternate embodiment, latch pin 119 may have a stationary inner round pin welded in a cantilever arrangement to each side of the dump gate 13 and a concentric outer shell tube which is free to rotate about the horizontal axis of the round pin, enabling the pin 119 to roll upward and out over inclined ramp 120a of the cradle catch 120. As known in the art, the outer end of latch pin 119 may additionally be supported such that it is not in a cantilever loading condition. For example, the outer end of latch pin 119 could be supported in a double-shear loading condition. In still further alternate embodiments, multiple latch pins and cradle catches may be provided in spaced arrangement at the sides of the rear body panel assembly 52 and dump gate 13. In other alternate embodiments of a dump body 11 which do not include a rear body panel assembly 52, the one or more latch pins and cradle catches may be arranged to latch between the dump body itself and the dump gate, or between end columns (not shown) on the dump body and the dump gate.

As used herein and in the claims, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

All references mentioned in this specification are indicative of the level of skill in the art of this invention. All references are herein incorporated by reference in their entirety to the same extent as if each reference was specifically and individually indicated to be incorporated by reference. However, if any inconsistency arises between a cited reference and the present disclosure, the present disclosure takes precedence. Some references provided herein are incorporated by reference herein to provide details concerning the state of the art prior to the filing of this application, other references may be cited to provide additional or alternative device elements, additional or alternative materials, additional or alternative methods of analysis or application of the invention.

The terms and expressions used are, unless otherwise defined herein, used as terms of description and not limitation. There is no intention, in using such terms and expressions, of excluding equivalents of the features illustrated and described, it being recognized that the scope of the invention is defined and limited only by the claims which follow. Although the description herein contains many specifics, these should not be construed as limiting the scope of the invention, but as merely providing illustrations of some of the embodiments of the invention.

One of ordinary skill in the art will appreciate that elements and materials other than those specifically exemplified can be employed in the practice of the invention without resort to undue experimentation. All art-known functional equivalents, of any such elements and materials are intended to be included in this invention within the scope of the claims, including without limitation the options and alternatives mentioned herein. The invention illustratively described herein suitably may be practiced in the absence of any element or elements, limitation or limitations which is not specifically disclosed herein.

We claim:

1. A trailer frame assembly for a fifth wheel trailer frame, the trailer frame being adapted to be pulled by a tractor, and having a longitudinal axis, a front portion adapted for connecting to the tractor, and a rear portion adapted to accommodate a connection to ground engaging wheels, the trailer frame assembly comprising:
   a pair of longitudinal, parallel spaced vertical side plates extending at least a portion of a length between the front portion and the rear portion of the trailer frame assembly, each side plate having a top portion and a bottom portion;
   a top pan extending generally horizontally between the top portions of the spaced side plates, the top pan having opposed side edge portions;
   a right angled top connecting wall formed on each of the side edge portions of the top pan to provide opposed top overlap joints parallel to the side plate and extending longitudinally along each of the side plates, the top overlap joints being formed at inwardly facing top portions of the side plates, and wherein the opposed side edge portions of the top pan each form a first right angled bend to provide the top connecting wall and a second right angled bend to provide a top flange extending horizontally above and outwardly from the side plates;
   a bottom pan extending generally horizontally between the bottom portions of the spaced side plates, the bottom pan having side edge portions;
   a right angled bottom connecting wall formed on each of the side edge portions of the bottom pan to provide opposed bottom overlap joints parallel to the side plate and extending longitudinally along each of the side plates, the bottom overlap joints being formed at inwardly facing bottom portions of the side plates;
   a plurality of top fasteners extending through the top overlap joints to connect the top pan and the spaced side plates;
   a plurality of bottom fasteners extending through the bottom overlap joints to connect the bottom pan and the spaced side plates;
   one or more vertical pan support plates connected between the top pan and the bottom pan; and
   the top fasteners and the bottom fasteners being threaded or rivet fasteners, and the one or more vertical pan support plates being connected to the top pan and the bottom pan with threaded or rivet fasteners;
   such that the connected spaced side plates, the top pan and the bottom pan together form at least a portion of the trailer frame assembly, and provide a rectangular closed section in a transverse cross section.

2. The trailer frame assembly of claim 1, wherein the side plates, the top pan, the bottom pan and the vertical pan support plates are formed from steel or aluminum plates or sheets.

3. The trailer frame of assembly claim 1, wherein the side plates, the top pan, the bottom pan and the vertical pan support plates are formed from steel plates or sheets, wherein each of the top pan and the bottom pan are formed in a plurality of longitudinally spaced sections, and wherein the vertical pan support plates extend transversely across at least a portion of a distance between the spaced side plates.

4. The trailer frame assembly of claim 3, wherein:
   the vertical pan support plates extend a portion of the distance between the spaced side plates and are centrally located between the side plates; and
   the vertical pan support plates are formed with right angled top and bottom flanges for connecting between the top pan and the bottom pan with threaded or rivet fasteners.

5. The trailer frame assembly of claim 3, wherein one or both of the top pan and the bottom pan is formed with cut out portions between the opposed side edge portions.

6. The trailer frame assembly of claim 5, wherein the cut out portions are generally triangular or diamond shaped.

7. The trailer frame assembly of claim 5, wherein the side plates are formed with cut out portions.

8. The trailer frame assembly of claim 7, which further comprises:
   the side plates having a reduced height at the front portion of the trailer frame to accommodate the tractor;
   a king pin assembly connected with threaded or riveted fasteners between the side plates at the front portion of the trailer frame;

a rear axle and suspension assembly connected to the rear portion of the trailer frame;
ground engaging wheels mounted on the rear axle and suspension assembly; and
a retractable landing gear leg connected to each of the side plates between the front portion and the rear portion of the trailer frame.

9. The trailer frame assembly of claim 8, which further comprises an upper longitudinal support members connected at the top portion of each of the side plate at the front portion of the side plates having a reduced height.

10. The trailer frame assembly of claim 9, which further comprises a bottom longitudinal support member connected at the lower portion of each of the side plates below the king pin assembly.

11. The trailer frame assembly of claim 9, wherein:
the opposed side edge portions of the top pan each form the top flange as the second right angle bend extending horizontally above and outwardly from the side plates; and
the upper longitudinal support members are U-rails extending over the top flange and being connected to the top flange with threaded or rivet fasteners.

12. The trailer frame assembly of claim 7, wherein the side plates extend from the front portion to the rear portion of the trailer frame, and wherein the trailer frame further comprises:
the side plates having a reduced height at the front portion of the trailer frame to accommodate the tractor;
a king pin assembly connected with threaded or riveted fasteners between the side plates at the front portion of the trailer frame;
a rear axle and suspension assembly connected with threaded or rivet fasteners between the side plates at the rear portion of the trailer frame;
ground engaging wheels mounted on the rear axle and suspension assembly; and
a retractable landing gear leg connected to each of the side plates between the front portion and the rear portion of the trailer frame.

13. The trailer frame assembly of claim 12, which further comprises a bottom longitudinal support member connected at the lower portion of each of the side plates below the king pin assembly.

14. The trailer frame assembly of claim 1, adapted for an end dump trailer having a dump body, and which further comprises:
a pair of parallel spaced, downwardly extending side plate extensions, each of the side plate extensions being connected to the lower portion of one of the side plates at an outer surface of the side plate at a position between the front portion and the rear portion of the trailer frame assembly;
a lower lift cylinder mounting assembly connected to each side plate extension, and adapted to provide a pivotal mount to an end of a lifting cylinder;
a cross member extending between the side plate extensions;
a rear hinge assembly connected at the rear portion of the trailer frame assembly adapted to connect to a rear end of the dump body.

15. The trailer frame assembly of claim 14, wherein the side plate extensions are connected to the side plates with threaded or rivet fasteners.

16. The trailer frame assembly of claim 14, which further comprises:
the dump body including a closed front end, an open rear end, a floor, opposed side walls, and an upper rail connected at a top end of each of the side walls and extending longitudinally along each of the side walls and laterally outwardly beyond the side plates, the dump body being hinged to the rear portion of the trailer frame at the rear end to the frame for pivotal movement between a lowered position for loading and transporting bulk material and a raised position for dumping the bulk material from Ws the open rear end;
a dump gate including an upper portion and a lower portion, the dump gate being horizontally pivotally connected at the upper end portion across the rear end of the dump body through a hinge assembly for movement between a closed position, wherein the dump gate closes the open rear end of the dump body, and an open position wherein the dump gate is swung rearwardly away from the open end of the dump body;
a pair of lift cylinders connected between the trailer frame and the dump body for raising and lowering the dump body on the frame; a lower end of each of the lift cylinders being pivotally connected to one of the lower lift cylinder mounting assemblies, and an upper end of each of the lift cylinders being pivotally connected to the upper rail of the dump body at a point rearwardly of the lower lift cylinder mounting assemblies such that each of the lift cylinders is angled generally rearwardly and upwardly from the lower end to the upper end.

17. The trailer frame assembly of claim 1, adapted for an end dump trailer, and which further comprises:
the trailer frame assembly adapted as the fifth wheel trailer frame with the ground engaging wheels;
each of the side plates having opposed ends, and a lower lift cylinder mounting assembly connected to an outer surface of each of the side plates forwardly of a midpoint between the opposed ends;
a dump body including a closed front end, an open rear end, a floor, opposed side walls, and an upper rail connected at a top end of each of the side walls and extending longitudinally along each of the side walls and laterally outwardly beyond the side plates, the dump body being hinged at the rear end to the frame for pivotal movement between a lowered position for loading and transporting bulk material and a raised position for dumping the bulk material from the open rear end;
a dump gate including an upper portion and a lower portion, the dump gate being horizontally pivotally connected at the upper end portion across the rear end of the dump body through a hinge assembly for movement between a closed position, wherein the dump gate closes the open rear end of the dump body, and an open position wherein the dump gate is swung rearwardly away from the open end of the dump body;
a pair of lift cylinders connected on opposed sides of the dump body between the frame and the dump body for raising and lowering the dump body on the frame; and
a lower end of each of the lift cylinders being pivotally connected to one of the lower lift cylinder mounting assemblies, and an upper end of each of the lift cylinders being pivotally connected to the upper rail of the dump body at a point rearwardly of the lower lift cylinder mounting assembly such that each of the lift cylinders is angled generally rearwardly and upwardly from the lower end to the upper end.

18. The trailer frame assembly of claim 17, wherein the lift cylinders are two or three stage double acting hydraulic cylinders, and have a length sufficient to raise the dump body to an angle which is at least 40 degrees to horizontal.

19. The trailer frame assembly of claim 18, wherein the dump body has a length to width ratio between 2.5:1 and 6:1, or between 3.5:1 and 4.5:1.

20. The trailer frame assembly of claim 19, wherein:
each of the lift cylinders is angled generally rearwardly, upwardly and outwardly from the lower end to the upper end;
wherein the pivotal connections at the upper and lower ends of each of the lift cylinders allow for pivotal movement in at least two planes; and
the upper rails include rail stiffening members at the point of connecting the upper end of the lift cylinder to each of the upper rails.

21. The trailer frame assembly of claim 20, wherein the upper end of the lift cylinder is connected to the upper rail at a point which is in a middle three quarters or a middle one half of the length of the dump body.

22. The trailer frame assembly of claim 21, wherein the floor of the dump body has a radiused cross section.

23. The trailer frame assembly of claim 21, wherein the side walls are integral with, or connected to, the floor; and the side walls are tapered, curved or vertical relative to the floor.

24. The trailer frame assembly of claim 21, wherein the floor is formed from a single sheet of steel, without a transverse seam.

25. The trailer frame assembly of claim 21, which further comprises a cross member extending between the side plates adjacent the lower ends of the lift cylinders for structural strength.

26. The trailer frame assembly of claim 25, wherein pivotal connections at the upper and lower ends of each of the lift cylinders are spherical ball joints to allow for pivotal movement in at least two planes.

27. The trailer frame assembly of claim 1, adapted as an end dump trailer, and further comprising:
the trailer frame assembly adapted as the fifth wheel trailer frame with the ground engaging wheels;
a dump body including a closed front end, an open rear end, a floor and opposed side walls, the dump body being supported on the frame and hinged at the rear end to the frame for pivotal movement between a lowered position for loading and transporting bulk material and a raised position for dumping the bulk material from the open rear end;
one or more lift cylinders between the frame and the dump body for raising and lowering the dump body on the frame;
a dump gate including an upper portion and a lower portion, the dump gate being horizontally pivotally connected at its upper end portion across the rear end of the dump body through a hinge assembly for movement between a closed position, wherein the dump gate closes the open rear end of the dump body, and an open position, wherein the dump gate is swung rearwardly away from the open end of the dump body; and
a pair of latch lift assemblies, each connected at opposing sides of the dump body between the dump body and the dump gate, for latching the dump gate in the closed position, each latch lift assembly including;
a horizontal latch pin connected to the side of the dump gate;
an upwardly opening cradle catch connected to the side of the dump body to receive the latch pin, the cradle catch forming a rearwardly and upwardly inclined ramp portion to retain the latch pin in a latched position;
a linkage assembly pivotally mounted between the dump body and the hinge assembly such that rotation of the linkage assembly imparts a vertical upward movement to the dump gate sufficient for the latch pin to clear the ramp portion of the cradle catch for unlatching, while also permitting the horizontal pivotal movement to the dump gate; and
an actuator connected between the dump body and the linkage assembly for rotating the linkage assembly.

28. The trailer frame assembly of claim 27, wherein:
the dump body includes a body rear panel assembly connected to the opposing sides of the dump body;
the linkage assembly and the actuator are enclosed in the body rear panel assembly to remain out of contact with the bulk material; and
the cradle catch is connected to a side of the body rear panel assembly to receive the latch pin.

29. The trailer frame assembly of claim 28, wherein:
the actuator includes a pressure activated cylinder and a driven rod connected to the cylinder; and
the linkage assembly includes a link plate and a tie rod, the tie rod having an upper end pivotally connected to the hinge assembly and a lower end pivotally connected to the link plate, the link plate having triangularly arranged first, second and third pivot points to provide a first pivot connection to the body rear panel assembly, a second pivot connection to the driven rod and a third pivot connection to the lower end of the tie rod, such that rotation of the link plate around the first pivot connection, and vertical upward movement to the dump gate, may be caused by extending the driven rod or retracting the driven rod.

30. The trailer frame assembly of claim 29, wherein the driven rod is positioned generally horizontally when the dump body is in the lowered position, and wherein the cylinder is air actuated.

31. The trailer frame assembly of claim 30, wherein:
the hinge assembly comprises a lift link arm extending generally horizontally between a fixed hinge mount on the body rear panel assembly and the upper portion of the dump gate, the lift link arm having a front pivotal connection to the fixed hinge mount and a rear pivotal connection to the dump gate, the rear pivotal connection being located more rearwardly than the front pivotal connection; and
the tie rod is pivotally connected at its the upper end to the lift link arm such that extension of the driven rod or retraction of the driven rod causes rotation of the link plate and the vertical upward movement to the dump gate.

32. The trailer frame assembly of claim 31, wherein the dump gate moves between the open and closed positions by gravity as the lift cylinder moves the dump body between the lowered and raised positions, and wherein the weight of the dump gate holds the latch pin in the cradle catch when the dump gate is in the closed position.

33. The trailer frame assembly of claim 32, wherein the air actuated cylinder is single acting to impart the vertical movement to the dump gate during opening by extending the driven rod.

34. The trailer frame assembly of claim 32, wherein the air actuated cylinder is double acting to impart the vertical movement to the dump gate during opening and closing by extending and retracting the driven rod.

* * * * *